United States Patent
Abe et al.

(10) Patent No.: US 7,111,866 B2
(45) Date of Patent: Sep. 26, 2006

(54) AIRBAG AND AIRBAG SYSTEM

(75) Inventors: Kazuhiro Abe, Shiga (JP); Rika Senoh, Shiga (JP)

(73) Assignee: Takata Corporation, Tokyo (JP)

( * ) Notice: Subject to any disclaimer, the term of this patent is extended or adjusted under 35 U.S.C. 154(b) by 401 days.

(21) Appl. No.: 10/680,403

(22) Filed: Oct. 8, 2003

(65) Prior Publication Data
US 2004/0145162 A1     Jul. 29, 2004

(30) Foreign Application Priority Data

| Jan. 23, 2003 | (JP) | ............................ 2003-015109 |
| Jan. 23, 2003 | (JP) | ............................ 2003-015110 |
| Jan. 23, 2003 | (JP) | ............................ 2003-015111 |
| Feb. 7, 2003  | (JP) | ............................ 2003-031139 |

(51) Int. Cl.
  *B60R 21/16*     (2006.01)
(52) U.S. Cl. .................................................... 280/729
(58) Field of Classification Search ................ 280/729, 280/736, 742, 743.1
  See application file for complete search history.

(56) References Cited

U.S. PATENT DOCUMENTS

| 5,165,716 A | 11/1992 | Imai et al. |
| 5,249,824 A | 10/1993 | Swann et al. |
| 5,253,892 A * | 10/1993 | Satoh ......................... 280/731 |
| 5,464,250 A | 11/1995 | Sato |
| 6,086,092 A * | 7/2000 | Hill ............................. 280/729 |
| 6,254,121 B1 * | 7/2001 | Fowler et al. ............. 280/729 |
| 6,834,884 B1 * | 12/2004 | Gu .............................. 280/729 |
| 6,866,291 B1 * | 3/2005 | Abe et al. ................... 280/729 |
| 2003/0020264 A1 | 1/2003 | Abe et al. |

FOREIGN PATENT DOCUMENTS

| EP | 1 318 052 A1 | 6/2003 |
| JP | 1-247242 A | 10/1989 |
| JP | 1-311930 A | 12/1989 |
| JP | 2-074440 A | 3/1990 |
| JP | 5-178146 A | 7/1993 |
| JP | 7-232607 A | 9/1995 |
| JP | 3022480 U | 12/1995 |
| JP | 8-104196 A | 4/1996 |
| JP | 9-315246 A | 12/1997 |
| JP | 2002-308039 A | 10/2002 |

* cited by examiner

*Primary Examiner*—Faye M. Fleming
(74) *Attorney, Agent, or Firm*—Foley & Lardner LLP

(57) ABSTRACT

An airbag and airbag system for a driver's seat. The airbag and airbag system is capable of maintaining high inner pressure for a long time even with the use of a low-capacity inflator. The airbag is also capable of having a first and second chamber divided by an inner panel where the second chamber is deployed and inflated earlier. The internal pressure of the airbag and the speed of deployment of the airbag may be adjusted for the first and second chamber individually.

27 Claims, 11 Drawing Sheets

AIRBAG AND AIRBAG SYSTEM

BACKGROUND OF THE INVENTION

The present invention relates to an airbag and an airbag system for protecting an occupant in emergency such as a car crash, and more particularly, it relates to an airbag and an airbag system suitable for driver's seat airbag mounted to a steering.

Most of driver's seat airbag systems have an airbag mounted to a retainer in a folded condition and covered with a cover member called a module cover.

When a car impact has been sensed by a sensor, an inflator is activated to deploy an airbag by a gas (inflation gas) generated from the inflator.

Japanese Unexamined Patent Application Publication No. 2-74440 (incorporated by reference) discloses a driver's seat airbag that is divided into two chambers, a central chamber and an outer peripheral chamber, by a partition panel, the central chamber being first inflated and the outer peripheral chamber being next inflated. The partition panel has a gas circulation hole. The partition panel connects the rear and the front of the airbag and has the function of preventing the forward projection of the airbag during inflation. A vent hole is provided at the central chamber.

When the airbag disclosed in Japanese Unexamined Patent Application Publication No. 2-74440 (incorporated by reference) is inflated and an occupant strikes against an occupant, gas in the outer peripheral chamber easily flows out through the vent hole of the central chamber. Therefore, in order to maintain the gas pressure in the outer peripheral chamber high over a long time, an inflator with long duration of gas generation must be used. Employing the inflator, however, makes it difficult to control the inner pressure of the airbag.

Accordingly, it is an object of the present invention to provide an airbag and an airbag system capable of maintaining high inner pressure for a long time even with a low-capacity inflator as compared with the conventional one.

The present invention relates to an airbag provided on a high-speed mobile body such as a vehicle, which deploys in case of emergency such as a collision for protecting a human body.

Various airbag systems such as an airbag system for a driver's seat are used for protecting an occupant in case of emergency such as a collision or the like of a vehicle. The airbag system for a driver's seat includes an airbag formed by seaming peripheries of a front panel on the occupant side and of a rear panel on the opposite side. The rear panel is formed with an inflator engaging opening for receiving the extremity of the inflator at the center thereof. The circumference of the opening is attached to a retainer by a bolt, a pin, a rivet, and the like. The rear panel is formed with a vent hole for releasing gas in the airbag when the occupant of the driver's seat crushes into the airbag for absorbing an impact.

In order to protect a passenger in an emergency such as a car collision, a variety of airbag apparatuses including a driver-side airbag apparatus have been used. The driver-side airbag apparatus has an airbag formed by stitching together the circumferential portions of a front panel close to a passenger and a rear panel remote from the passenger. The rear panel has an opening for engagement with an inflator, formed at the central part thereof in order to accept the front of the inflator therein. The periphery of the opening is fixed to a retainer with bolts, pins, rivets, or the like. The rear panel has vent holes for releasing air in the airbag so as to absorb a shock when the passenger sitting in the driver's seat runs into the airbag.

In Japanese Unexamined Patent Application Publication No. 1-247242 (incorporated by reference), an airbag including an inner panel extending between an inflator insertion aperture on the rear panel and the front panel, and being divided in the interior thereof into a first chamber at the center and a second chamber circumferentially thereof is disclosed. The inner panel is substantially circular shape and the outer periphery thereof is connected to the midsection between the center and the periphery of the front panel. The inner panel is formed with the opening for the inflator at the center thereof, and the edge of the opening is attached to the retainer together with the rear panel. The inner panel is formed with a communication port for communicating the first chamber and the second chamber. When the inflator is actuated, the first chamber is deployed first, and the second chamber is deployed subsequently.

In the airbag in the same patent publication, since gas is flown into the second chamber from the first chamber through the communication port, completion of deployment of the second chamber is later than completion of deployment of the first chamber. In addition, it is difficult to adjust the internal pressure or the speed of deployment of the first chamber and the second chamber individually.

Japanese Unexamined Patent Application Publication No. 1-247242 (incorporated by reference) has disclosed an airbag in which an inner panel is disposed like extending between the inflator-engaging opening of the rear panel and the front panel so as to partition the inner space of the airbag into a first compartment and a second compartment. The inner panel has an approximately round shape when folded, and its outer circumferential portion is connected to an intermediate portion lying between the central portion and the circumferential portion of the front panel. The inner panel has an inflator-engaging opening at the central part thereof and the periphery of the opening is fixed to the retainer together with the rear panel. The inner panel has communication ports for mutual communication of the first compartment and the second compartment. When the inflator is activated, the first compartment inflates first and the second compartment inflates subsequently. Since gas flows into the second compartment from the first compartment through the communication ports, complete inflation of the second compartment lags behind complete inflation of the first compartment.

SUMMARY OF THE INVENTION

An object of the present invention is to provide the airbag including the first chamber and the second chamber divided by the inner panel, in which earlier deployment of the second chamber is realized and the internal pressure and the speed of deployment can be adjusted individually for the first chamber and the second chamber.

Another object of the present invention is to facilitate early inflation of the second compartment of the airbag having an inner space partitioned into the first compartment and the second compartment.

An airbag according to an embodiment of the present invention has openings for supplying gas on the rear and faces an occupant in inflation on the front. The interior of the airbag is partitioned into a central chamber facing the openings, an outer-peripheral front chamber arranged on the outer periphery of the central chamber adjacent to the front, and an outer-peripheral rear chamber arranged on the outer periphery of the central chamber adjacent to the rear. The outer-peripheral rear chamber communicates with the exterior of the airbag through vent holes. The central chamber communicates directly with the outer-peripheral front chamber and the outer-peripheral rear chamber. The outer-peripheral front chamber and the outer-peripheral rear chamber communicate with each other only via the central chamber. The gas for inflating the airbag flows from the central chamber to the outer-peripheral front chamber and the outer-peripheral rear chamber.

With such an airbag, gas is supplied into the airbag from an opening or an inflator inserted into the opening to inflate the airbag. The gas first inflates the central chamber and then inflates the outer-peripheral front chamber and the outer-peripheral rear chamber. The outer-peripheral front chamber does not communicate directly with the outer-peripheral rear chamber, so that the gas in the outer-peripheral front chamber flows out through the vent holes via the central chamber and the outer-peripheral rear chamber. Consequently, the gas is held in the outer-peripheral front chamber for a long time as compared with the conventional one; thus, the outer periphery of the airbag can sufficiently absorb the impact of the occupant even with a low-capacity inflator.

An airbag according to the present invention has openings for supplying gas on the rear and faces an occupant in inflation on the front. The interior of the airbag is partitioned into a central chamber facing the openings, an outer-peripheral front chamber arranged on the outer periphery of the central chamber adjacent to the front, and an outer-peripheral rear chamber arranged on the outer periphery of the central chamber adjacent to the rear. The outer-peripheral rear chamber communicates with the exterior of the airbag through vent holes. The central chamber communicates directly with the outer-peripheral front chamber and the outer-peripheral rear chamber. The outer-peripheral front chamber and the outer-peripheral rear chamber communicate directly with each other. The gas for inflating the airbag flows from the central chamber to the outer-peripheral front chamber and the outer-peripheral rear chamber.

Also with such an airbag, gas is supplied into the airbag from an opening or an inflator inserted into the opening to inflate the airbag. The gas first inflates the central chamber and then inflates the outer-peripheral front chamber and the outer-peripheral rear chamber. The outer-peripheral front chamber does not communicate directly with the vent holes, so that the gas in the outer-peripheral front chamber flows out through the vent holes via the outer-peripheral rear chamber or the central chamber and the outer-peripheral rear chamber. Consequently, the gas is held in the outer-peripheral front chamber for a long time as compared with the conventional one; thus, the outer periphery of the airbag can sufficiently absorb the impact of the occupant even with a low-capacity inflator.

According to the present invention, the central chamber may be arranged to reach from the rear to the front during the inflation of the airbag. With such an arrangement, the center of the airbag is first inflated early. The outer-peripheral front chamber and the outer-peripheral rear chamber are inflated sideward from the early inflated central chamber, and so the outer periphery of the airbag is also allowed to receive the occupant early.

An airbag system according to the present invention includes an airbag having openings for supplying gas on the rear and facing an occupant in inflation on the front and an inflator for inflating the airbag. The interior of the airbag includes a central rear chamber arranged on the rear of the center and facing the openings, a front chamber arranged on the front of the airbag, and an outer-peripheral chamber arranged on the outer periphery of the central rear chamber. The central rear chamber, the front chamber, and the outer-peripheral chamber communicate with one another. The inflator includes a plurality of gas generators with different gas-generation timings.

With such an airbag system, when the inflator is activated, the central rear chamber is first inflated, from which the gas is supplied to the front chamber and the outer peripheral chamber to inflate the entire airbag. With the airbag system, the inflator has a plurality of gas generators with different gas-generation timings, so that the inner pressure of the inflated airbag can be maintained high for a long time.

In the airbag system, the front chamber of the airbag may occupy substantially the whole of the front of the airbag. With such an arrangement, the inner pressure of substantially the entire front can be maintained high for a long time.

According to the airbag system of another embodiment, the airbag system includes an airbag, a gas generator having a gas injection port, the gas generator having at least a distal end thereof disposed in the airbag, and the gas injection port being disposed in the airbag, wherein the airbag includes a front panel to be disposed on the occupant side, and a rear panel to be disposed on the side opposite from the occupant, the front panel and the rear panel are joined at the peripheral edges thereof, the rear panel includes an opening for the gas generator at the center thereof, an inner panel for dividing the interior of the airbag into a first chamber located at the center and a second chamber surrounding the first chamber is arranged, the inner panel is formed with an opening at the center thereof substantially concentrically with the opening of the rear panel, and the peripheral edge of the inner panel on the distal end side is joined to the front panel at the midsection between the central portion and the peripheral edge thereof.

According to an embodiment of the present invention, the airbag system may include a gas generator having a plurality of, at least first and second, gas generating units, the gas generating units each include a gas injection port, the inner panel is formed on the rear end side thereof with a communication port for communicating the first chamber and the second chamber, the communication port opposes the gas injection port of the first gas generating unit and the gas injection port of the gas generating unit other than the first gas generating unit does not oppose the communication port in a state in which the airbag is deployed.

The communication port communicating the first chamber and the second chamber in the airbag may be disposed so as to oppose the gas injection port of the first gas generating unit of the gas generator disposed in the first chamber through the openings for the gas generator formed on the rear panel and the inner panel in a state in which the airbag is deployed. Therefore, when the gas generator is actuated, gas is injected from the gas injection port of the first gas generating unit toward the communication port. Therefore, gas from the first gas generating unit passes through the communication port and directly supplied into the second chamber. Accordingly, the second chamber deploys early.

In the airbag system of an embodiment of the present invention, since the gas injection port of the gas generating unit other than the first gas generating unit does not oppose the communication port, when the gas generator is actuated, gas from the gas generating unit other than the first gas generating unit is supplied only to the first chamber in a first place. Therefore, by adjusting outputs of the first gas generating unit and other gas generating units respectively, the internal pressure or the speed of deployment can be adjusted individually for the first chamber and the second chamber. By adjusting the timings of actuation of the first gas generating unit and other gas generating units, the timing to start deployment or the timing to complete deployment of the first chamber and the second chamber can be adjusted.

In the airbag system according to an embodiment of the present invention, preferably, the rear panel of the airbag is formed with a vent hole, and the inner panel is formed with an inner vent hole for communicating the first chamber and the second chamber. In this arrangement, when a human body clashes against the deployed airbag, gas in the first chamber and the second chamber is released via the inner vent hole and the vent hole, so that impact can be absorbed.

An airbag according to the present invention which inflates with gas discharged from a gas generator includes a front panel disposed close to a passenger and a rear panel disposed remote from the passenger, the circumferential portions of the front panel and the rear panel being bonded to each other, wherein the rear panel has a gas-generator-engaging opening formed at the central part thereof, and the airbag further includes an inner panel for partitioning the inner space of the airbag into a central first compartment and a second compartment encircling the first compartment, wherein the inner panel has an opening formed at the central part thereof so as to be almost concentric with the opening of the rear panel; the front circumferential portion of the inner panel is bonded to an intermediate portion lying between the central portion and the circumferential portion of the front panel; the inner panel has at least one communication port formed close to the rear thereof, for mutual communication of the first compartment and the second compartment; and the communication port lies on the line extending along a gas-discharge direction of the gas generator when the airbag is inflated.

Also, an airbag apparatus according to an embodiment of the present invention includes an airbag and a gas generator having at least one gas-discharge opening, wherein at least the front of the gas generator is disposed in the airbag and the gas-discharge opening is disposed in the airbag; and the communication port is disposed on the line extending along gas-discharge direction of the gas-discharge opening of the gas generator when the airbag is inflated.

In the airbag and the airbag apparatus according to an embodiment of the present invention, the communication port for mutual communication of the first compartment and the second compartment in the airbag is disposed on the line extending along a gas-discharge direction of the gas generator disposed in the first compartment so as to extend through the gas-generator-engaging openings of the rear panel and the inner panel, that is, the communication port is disposed so as to face the gas-discharge opening of the gas generator. Accordingly, when the gas generator is activated, gas is discharged from the gas-discharge opening toward the communication port. Thus, part of the gas discharged from the gas generator flows through the communication port and is directly fed to the second compartment. With this arrangement, the second compartment inflates at an early stage.

The airbag according to the present invention may have a structure in which the rear panel has at least one vent hole formed therein, and the inner panel has at least one inner vent hole formed therein for mutual communication of the first compartment and the second compartment. With this structure, when a human body runs into the inflated airbag, a shock can be absorbed by releasing the gas in the first compartment and the second compartment through the inner vent hole and the vent hole.

The airbag apparatus according to an embodiment of the present invention may have a structure in which the number of said at least one gas-discharge openings is plural; the communication ports are disposed on the lines extending along gas-discharge directions of a part of the gas-discharge openings of the gas generator when the airbag is inflated; and the panel portion of the inner panel lies on the lines extending along gas-discharge directions of the remaining of the gas-discharge openings. In this case, gas discharged from the part of the gas-discharge openings (hereinafter, also referred to as second-compartment gas-discharge openings) is directly fed to the second compartment through the communication ports so as to inflate the second compartment at an early stage. Since gas discharged from the remaining of the gas-discharge openings (hereinafter, also referred to as first-compartment gas-discharge openings) strikes the panel portion of the inner panel, this gas remains mainly in the first compartment, thereby inflating the first compartment at an early stage In this case, the first compartment and the second compartment may be arranged so as to inflate almost simultaneously. For example, by adjusting the numbers of the first-compartment gas-discharge openings and the second-compartment gas-discharge openings and the sizes of the communication ports, the first compartment and the second compartment can be inflated almost simultaneously.

Even when the communication ports are disposed on the lines extending along the gas-discharge directions of all of the gas-discharge openings, by making the sizes of the communication ports slightly smaller so as to limit an amount of gas directly flowing into the second compartment, the first compartment and the second compartment can be inflated almost simultaneously.

An airbag apparatus according to an embodiment of the present invention includes an airbag and a gas generator having at least one gas-discharge opening, wherein at least the front of the gas generator is disposed in the airbag and the gas-discharge opening is disposed in the airbag; the inner space of the airbag is partitioned into a central first compartment and a second compartment encircling the first compartment; and the first compartment and the second compartment inflate almost simultaneously when the gas generator is activated.

As described below, the term "almost simultaneously" includes a lapse of time $t_1$ from the start of activation of the gas generator to complete inflation of the first compartment and a lapse of time $t_2$ from the same to complete inflation of the second compartment are defined, the ratio $t_1/t_2$ lies in the range from 0.9 to 1.1.

When the first compartment and the second compartment inflate almost simultaneously as described above, a surface of the largely expanded airbag facing a passenger can receive the passenger.

It is to be understood that both the foregoing general description and the following detailed description are exemplary and exemplary only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 shows a fully inflated airbag.

FIG. 3 includes side views of a driver's seat of a car equipped with the airbag system of FIG. 1.

DETAILED DESCRIPTION

Figure 1:
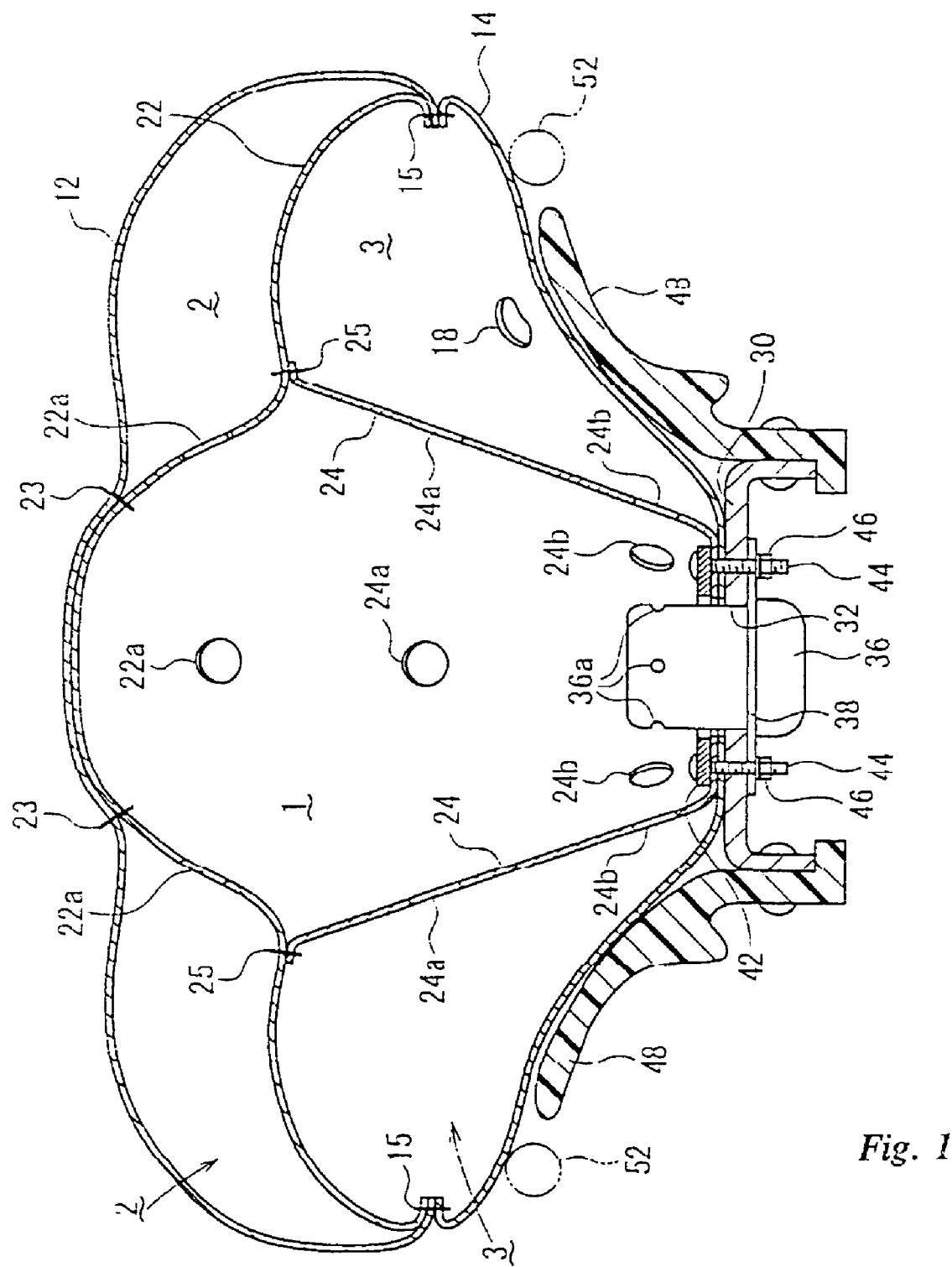
FIG. 1 is a longitudinal sectional view of an airbag and an airbag system according to an embodiment of the present invention.

The airbag 10 includes a front panel 12, a rear panel 14, a first inner panel 22, and a second inner panel 24, which are each made of a circular woven fabric. The outer peripheries of the front panel 12 and the rear panel 14 are stitched together with a seam 15 made of thread or the like into a bag form. The stitched section is shaped like a ring around the outer peripheries of the front panel 12 and the rear panel 14.

The rear panel 14 has an inflator opening 16 and vent holes 18. The inflator opening 16 is arranged in the center of the rear panel 14. Bolt insertion holes 20 are provided around the inflator opening 16. The vent holes 18 are arranged relatively close to the outer periphery of the rear panel 14.

The first inner panel 22 and the second inner panel 24 are provided in the airbag 10. The first inner panel 22 is centered at an identical point to the front panel 12 and the rear panel 14, the outer periphery of the first inner panel 22 being superposed on the outer peripheries of the front panel 12 and the rear panel 14 and stitched together with the seam 15. The center of the first inner panel 22 is stitched to the center of the front panel 12 with a seam 23 made of thread or the like. The stitched section with the seam 23 is shaped like a ring concentrically arranged about the centers of the front panel 12 and the rear panel 14.

The first inner panel 22 has communication holes 22a relatively adjacent to the outer periphery thereof.

The second inner panel 24 is centered at an identical point to the first inner panel 22 and the rear panel 14 therebetween, the outer peripheries of which are stitched to the first inner panel 22 with a seam 25 made of thread or the like at the center between the stitched section with the seam 23 and the communication holes 22a. The stitched section with the seam 25 is shaped like a ring around the outer periphery of the second inner panel 24. The second inner panel 24 has an opening 26 at the center of the second inner panel 24, the opening 26 being arranged concentrically with the inflator opening 16 of the rear panel 14. Bolt insertion holes 28 that overlap with the bolt insertion holes 20 of the rear panel 14 are provided around the opening 26.

The second inner panel 24 has communication holes 24a relatively adjacent to the periphery thereof and through holes 24b adjacent to the center.

The periphery of the inflator opening 26 of the second inner panel 24 is overlapped with the periphery of the inflator opening 16 of the rear panel 14 and the periphery of an inflator-mounting hole 32 of a retainer 30. The peripheries of the inflator openings 26 and 16 are secured to the retainer 30 through the bolt insertion holes 28 and 20. Thus, the periphery of the inflator opening 26 of the second inner panel 24 is connected to the periphery of the inflator opening 16 of the rear panel 14.

The first inner panel 22 and the second inner panel 24 partition the interior of the airbag 10 into a central chamber 1, an outer-peripheral front chamber 2 arranged on the outer periphery of the central chamber 1 adjacent to the front (near the front panel 12), and an outer-peripheral rear chamber 3 arranged on the outer periphery of the central chamber 1 adjacent to the rear (near the rear panel 14).

Specifically, the central chamber 1 is a space inside the second inner panel 24 and faces the respective inflator openings 26 and 16 of the second inner panel 24 and the rear panel 14. The outer-peripheral front chamber 2 is a space between the front panel 12 and the first inner panel 22, which is partitioned by the seams 15 and 23. The outer-peripheral rear chamber 3 is a space surrounded by the second inner panel 24, the first inner panel 22, and the rear panel 14 on the outside of the second inner panel 24.

The central chamber 1 communicates directly with both the outer-peripheral front chamber 2 and the outer-peripheral rear chamber 3 through the communication holes 22a and 24a. The outer-peripheral front chamber 2 and the outer-peripheral rear chamber 3 communicate with each other through the communication holes 22a and 24a only via the central chamber 1. The outer-peripheral rear chamber 3 communicates with the exterior of the airbag 10 through the vent holes 18.

Figure 2:
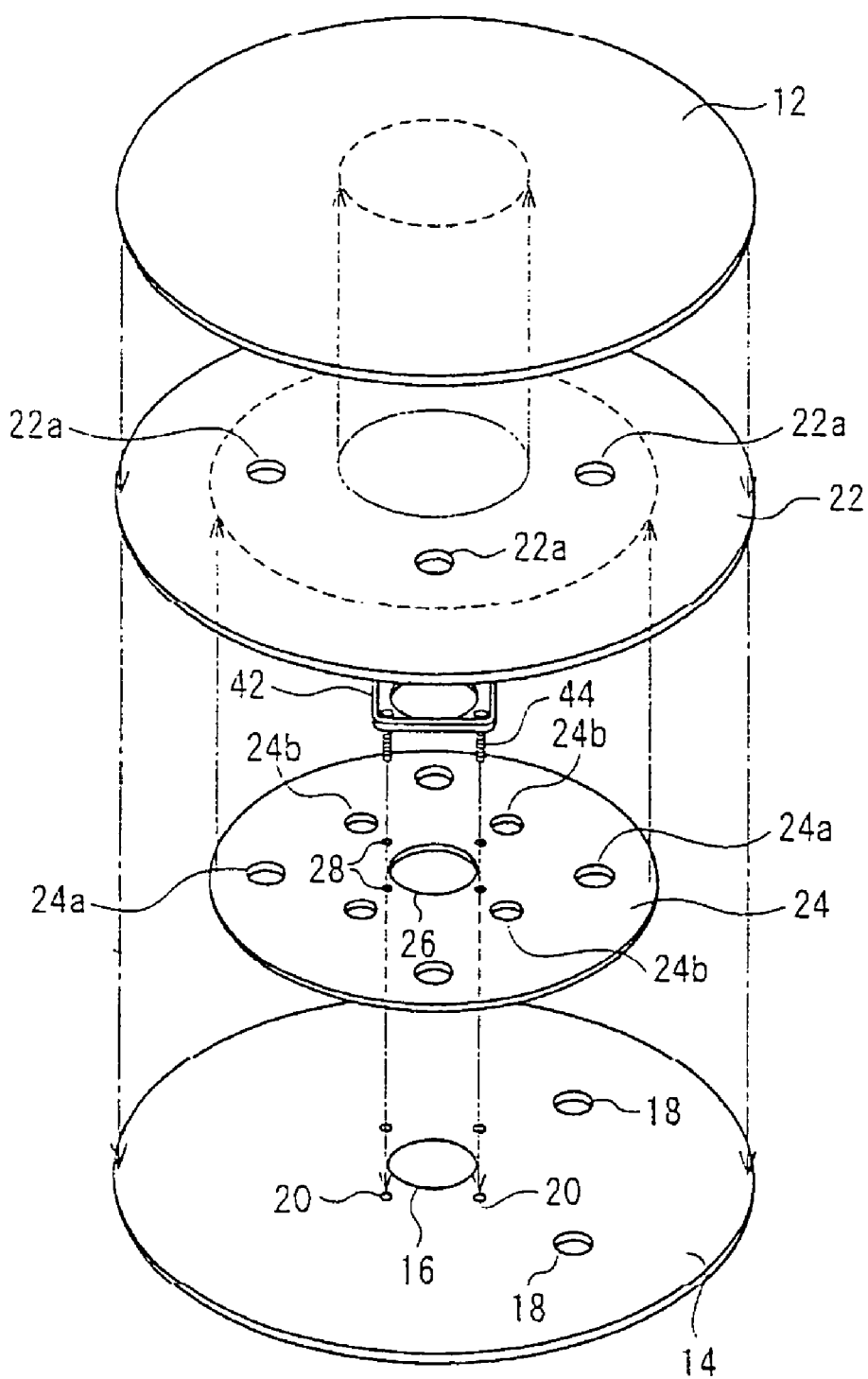
FIG. 2 is an exploded perspective view of the airbag and the airbag system of FIG. 1.

The embodiment has four communication holes 22a and 24a each, which are spaced evenly along the circumference of the airbag 10, as shown in FIG. 2. The embodiment has also four through holes 24b. The through holes 24b and the communication holes 24a are out of circumferential phase with respect to the center of the airbag 10. The through holes 24b are formed on the extension of the direction of the jet of gas from an inflator 36 (which will be described later), or in the position opposed to gas ports 36a of the inflator 36.

The peripheries of the openings 16 and 26, the communication holes 22a and 24a, and the through holes 24b may have a reinforcing patch (not shown) around the peripheries.

The retainer 30 for mounting the airbag 10 has the inflator-mounting hole 32 at the center and bolt insertion holes (not shown) therearound.

The inflator 36 is substantially cylindrical and has the gas ports 36a around the peripheral side surface of the axial end thereof. The embodiment has four gas ports 36a spaced evenly along the circumference of the inflator 36. The inflator 36 is constructed to jet a gas radially from the gas ports 36a. A flange 38 for fastening the inflator 36 projects from the peripheral side surface in the axial middle of the inflator 36 (closer to the rear than the gas ports 36a). The flange 38 has bolt insertion holes (not shown). The end of the inflator 36 is fitted in the inflator-mounting hole 32 of the retainer 30.

When mounting the airbag 10 to the retainer 30, the peripheries of the respective inflator openings 16 and 26 of the rear panel 14 and the second inner panel 24 are pressed to the periphery of the inflator-mounting hole 32 of the retainer 30 with a ferrule 42 for holding. The end of the inflator 36 fitted in the inflator-mounting hole 32 is inserted into the central chamber 1 through the inflator openings 16 and 26. The gas ports 36a at the end of the inflator 36 are opposed to the through holes 24b of the second inner panel 24.

At that time, stud bolts 44 of the ferrule 42 are inserted into the respective bolt insertion holes 28 and 20 of the rear panel 14 and the second inner panel 24 and the bolt insertion holes of the retainer 30 and the flange 38, on the ends of which nuts 46 are fastened, thereby fixing the first inner panel 22, the airbag 10, and the inflator 36 to the retainer 30. The airbag 10 is folded and a module cover 48 is mounted to the retainer 30 so as to cover the folded airbag 10; thus, the airbag system is formed. The airbag system is mounted to a steering wheel 50 of a car (only a rim 52 is shown in FIG. 1).

In the airbag system with such a structure, the inflator 36 is activated to jet a gas into the airbag 10 in a car crash. The airbag 10 is inflated by the gas to force open the module cover 48 into the interior of the car, thereby protecting a driver's seat occupant.

With the airbag 10, the gas from the inflator 36 is supplied into the central chamber 1 to inflate it. The gas then flows into the outer-peripheral front chamber 2 and the outer-peripheral rear chamber 3 through the communication holes 22a and 24a, respectively, to inflate them.

Figure 3A:
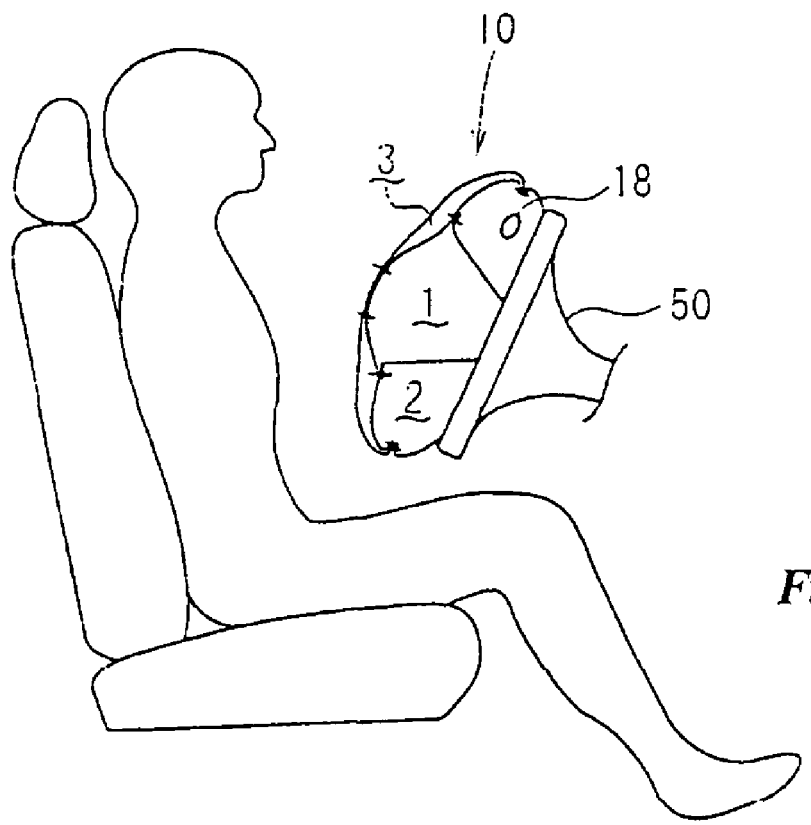
FIG. 3(a) shows an airbag halfway through inflation.

In the embodiment, the second inner panel 24 for partitioning the central chamber 1 and the outer-peripheral rear chamber 3 from each other has the through holes 24b on the extension of the direction of the jet of gas from the inflator 36, or in the position opposed to the gas ports 36a of the inflator 36. Therefore, when the inflator 36 is activated, the gas is discharged from the gas ports 36a toward the through holes 24b and directly supplied also to the outer-peripheral rear chamber 3 through the through holes 24b. Therefore, the outer-peripheral rear chamber 3 is inflated sideward substantially at the same time as the central chamber 1, as shown in FIG. 3(a). Consequently, the airbag 10 is allowed to receive an occupant early also by the outer periphery.

When an occupant has struck against the inflated airbag 10, the gas in the airbag 10 flows out through the vent holes 18 to the exterior of the airbag 10 to absorb the impact. At that time, since the outer-peripheral front chamber 2 does not communicates directly with the outer-peripheral rear chamber 3 which faces the vent holes 18, the gas in the outer-peripheral front chamber 2 flows out through the vent holes 18 via the central chamber 1 and the outer-peripheral rear chamber 3. Accordingly, the airbag 10 holds the gas in the outer-peripheral front chamber 2 for a relatively long time; thus, the outer periphery of the airbag 10 can sufficiently absorb the impact of the occupant even with a low-output inflator 36.

According to the embodiment, the center of first inner panel 22 is stitched to the center of the front panel 12 and the periphery of the inflator opening 26 of the second inner panel 24 is joined to the inflator opening 16 of the rear panel 14 with the ferrule 42; thus, the central chamber 1 extends from the rear to the front of the airbag 10. Therefore, the central chamber 1 is first inflated by the gas from the inflator 36, so that the center of the airbag 10 is inflated early. The outer-peripheral front chamber 2 and the outer-peripheral rear chamber 3 are inflated laterally from the early inflated central chamber 1, which allows also the outer periphery of the airbag 10 to receive the occupant early.

Figure 4:
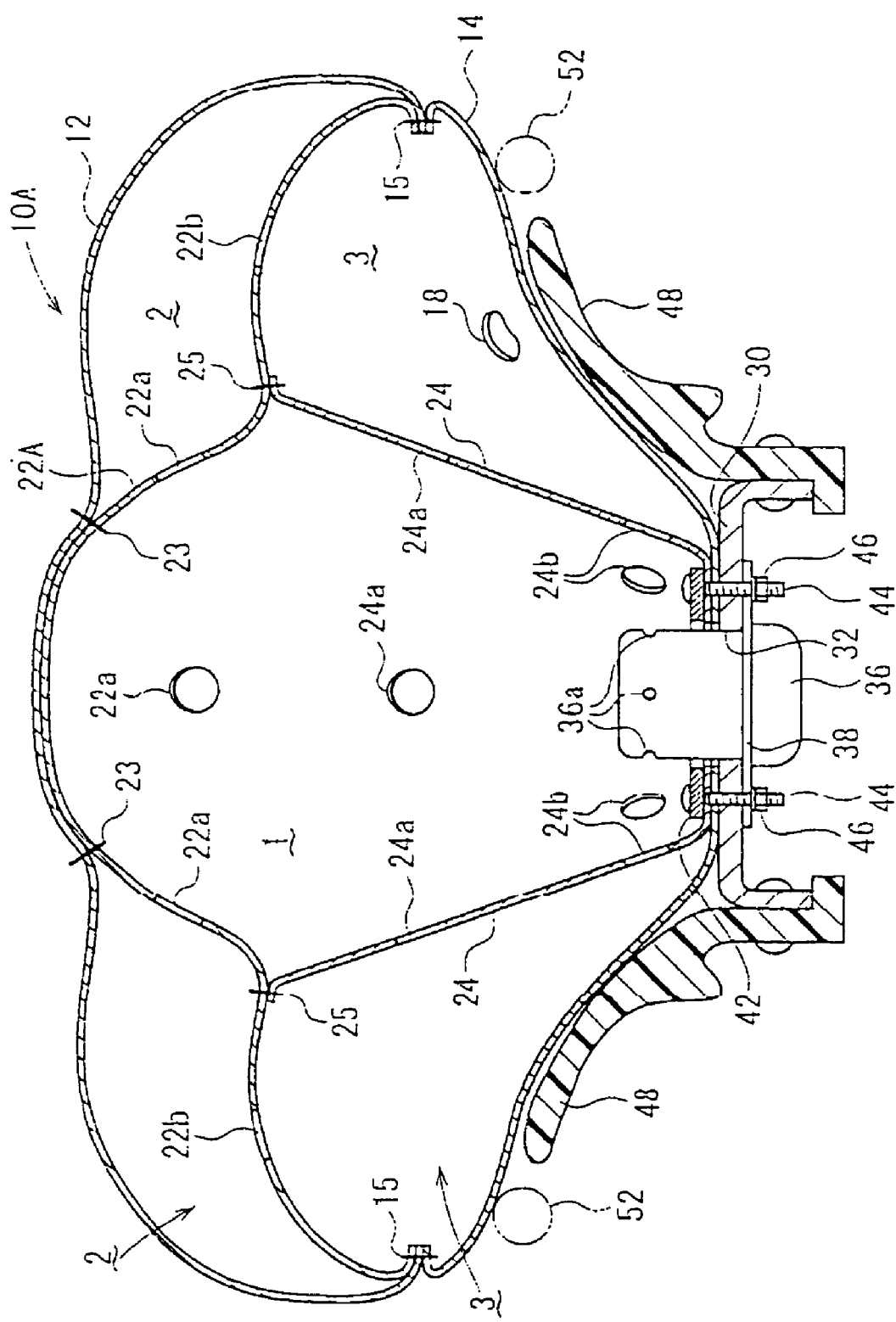
FIG. 4 is a longitudinal sectional view of an airbag and an airbag system according to another embodiment of the invention.

FIG. 4 is a longitudinal sectional view of an airbag and an airbag system according to another embodiment of the present invention.

Also in the embodiment, an airbag 10A whose shell is made up of the front panel 12 and the rear panel 14 is partitioned into the central chamber 1 facing the inflator openings of the second inner panel 24 and the rear panel 14, the outer-peripheral front chamber 2 arranged on the outer periphery of the central chamber 1 adjacent to the front, and the outer-peripheral rear chamber 3 arranged on the outer periphery of the central chamber 1 adjacent to the rear by a first inner panel 22A and the second inner panel 24.

The central chamber 1 and the outer-peripheral front chamber 2 are partitioned by the first inner panel 22A; the central chamber 1 and the outer-peripheral rear chamber 3 are partitioned by the second inner panel 24; and the outer-peripheral front chamber 2 and the outer-peripheral rear chamber 3 are partitioned by the first inner panel 22A. The central chamber 1 communicates directly with both the outer-peripheral front chamber 2 and the outer-peripheral rear chamber 3 through the communication holes 22a and 24a, respectively. The outer-peripheral rear chamber 3 communicates with the exterior of the airbag 10A through the vent holes 18.

In the embodiment, the first inner panel 22A for partitioning the outer-peripheral front chamber 2 and the outer-peripheral rear chamber 3 from each other has communication holes 22b that communicate the outer-peripheral front chamber 2 and the outer-peripheral rear chamber 3 with each other.

Figure 3B:
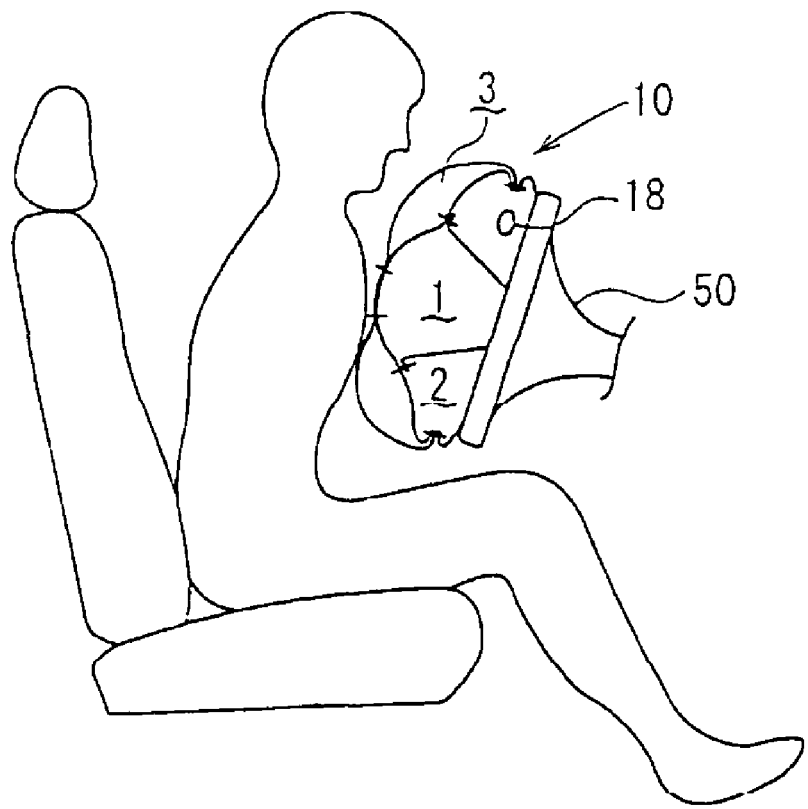
FIG. 3(b) shows when an occupant strikes against the fully inflated airbag.

Since other arrangements of the airbag 10A are the same as those of the airbag 10 of FIGS. 1 to 3, a description thereof will be omitted here by giving the same numerals to the same elements of FIG. 4 as those of FIGS. 1 to 3.

Also in an airbag system of FIG. 4 having the airbag 10A, when the inflator 36 arranged in the central chamber 1 through the inflator openings of the rear panel 14 and the second inner panel 24 is activated, the gas from the inflator 36 first inflates the central chamber 1, and flows into the outer-peripheral front chamber 2 and the outer-peripheral rear chamber 3 through the communication holes 22a and 24a, respectively to inflate the outer-peripheral front chamber 2 and the outer-peripheral rear chamber 3. The outer-peripheral front chamber 2 does not directly face the vent holes 18; and thus, the gas in the outer-peripheral front chamber 2 flows out through the vent holes 18 to the exterior of the airbag 10A via the outer-peripheral rear chamber 3 or the central chamber 1 and the outer-peripheral rear chamber 3.

Accordingly, even with the airbag 10A, the gas is held in the outer-peripheral front chamber 2 longer than that of the conventional one; thus, the impact of the occupant can be sufficiently absorbed by the outer periphery of the airbag 10A even with the inflator 36 having a relatively low capacity.

In the embodiment, the communication holes 22b for communicating the outer-peripheral front chamber 2 with the outer-peripheral rear chamber 3 may be closed by a closing member such as a breakable film that is broken to open the communication holes 22b when the inner pressure in the outer-peripheral front chamber 2 has reached a predetermined value or more.

With such an arrangement, when the inner pressure in the outer-peripheral front chamber 2 is lower than the predetermined pressure, the gas outflow from the outer-peripheral front chamber 2 can be controlled to hold the inner pressure in the outer-peripheral front chamber 2 for a long time. Also when the occupant collides strongly with the inflated airbag 10A to increase the inner pressure in the outer-peripheral front chamber 2 to the predetermined value or more, the closing member opens the communication holes 22b to promote the outflow of the gas in the outer-peripheral front chamber 2. This increases the rate of absorption of the impact.

Figure 5:
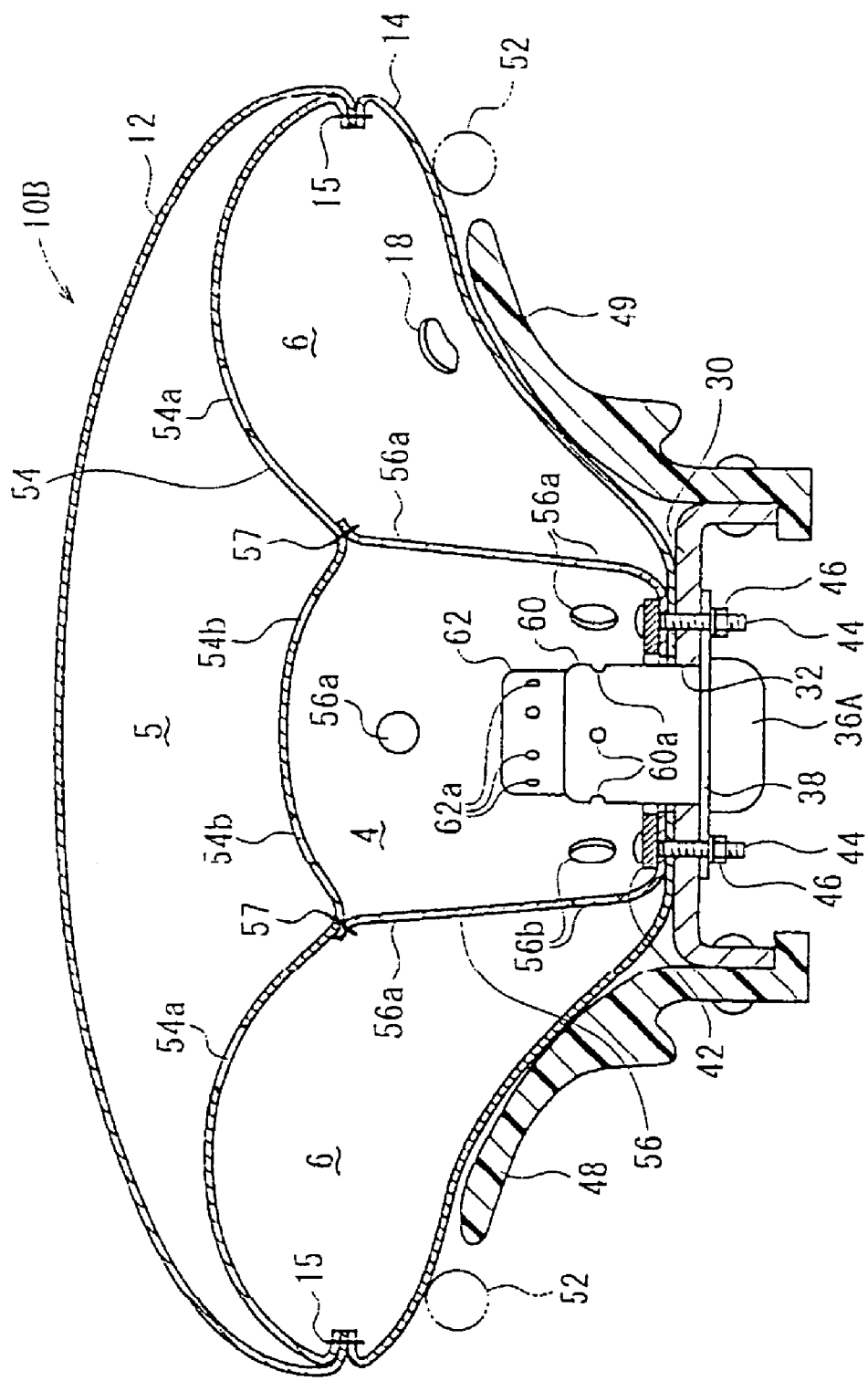
FIG. 5 is a longitudinal sectional view of an airbag and an airbag system according to yet another embodiment of the invention.

FIG. 5 is a longitudinal sectional view of an airbag and an airbag system according to yet another embodiment of the present invention.

Also in this embodiment, an airbag 10B includes the front panel 12, the rear panel 14, a first inner panel 54, and a second inner panel 56, which are each made of a circular woven fabric. The outer peripheries of the front panel 12 and the rear panel 14 are stitched together with the seam 15 made of thread or the like into a bag form. The rear panel 14 has an inflator opening (its numeral is omitted) and vent holes 18. The inflator opening is arranged in the center of the rear panel 14. The vent holes 18 are arranged relatively adjacent to the outer periphery of the rear panel 14.

The first inner panel 54 and the second inner panel 56 are provided in the airbag 10B. The first inner panel 54 is centered at an identical point to the front panel 12 and the rear panel 14, the outer periphery of the first inner panel 54 being superposed on the outer peripheries of the front panel 12 and the rear panel 14 and stitched together with the seam 15. The first inner panel 54 has communication holes 54a relatively adjacent to the outer periphery thereof and other communication holes 54b adjacent to the center.

The second inner panel 56 is centered at an identical point to the first inner panel 54 and the rear panel 14 therebetween, the outer peripheries of the second inner panel 56 being stitched to the first inner panel 54 with a seam 57 made of thread or the like at the center between the communication holes 54a and the communication holes 54b. The stitched section with the seam 57 is shaped like a ring around the outer periphery of the second inner panel 56. The second inner panel 56 has an inflator opening (its numeral is omitted) at the center, which is arranged concentrically with the inflator opening of the rear panel 14.

The second inner panel 56 has communication holes 56a relatively adjacent to the periphery thereof and through holes 56b adjacent to the center.

The periphery of the inflator opening of the second inner panel 56 is overlapped with the periphery of the inflator opening of the rear panel 14 and is overlapped with the periphery of the inflator-mounting hole 32 of the retainer 30, thus being fixed to the retainer 30. Thus, the periphery of the inflator opening of the second inner panel 56 is connected to the periphery of the inflator opening of the rear panel 14.

The first inner panel 54 and the second inner panel 56 partition the interior of the airbag 10B into a central rear chamber 4, a front chamber 5 arranged on the front of the airbag 10B (adjacent to the front panel 12), and an outer peripheral chamber 6 arranged on the outer periphery of the central rear chamber 4.

Specifically, the central rear chamber 4 is a space inside the second inner panel 56, which is arranged at the center of the airbag 10B adjacent to the rear and faces the inflator openings of the second inner panel 56 and the rear panel 14. The outer-peripheral front chamber 5 is a space between the front panel 12 and the first inner panel 54, which is arranged on the front of the airbag 10B. The front chamber 5 of this embodiment occupies substantially the whole of the front of the airbag 10B. The outer-peripheral Specifically, the central rear chamber 4 is a space inside the second inner panel 56, which is arranged at the center of the airbag 10B adjacent to the rear and faces the inflator openings of the second inner panel 56 and the rear panel 14. The outer-peripheral front chamber 5 is a space between the front panel 12 and the first inner panel 54, which is arranged on the front of the airbag 10B. The front chamber 5 of this embodiment occupies substantially the whole of the front of the airbag 10B. The outer-peripheral chamber 6 is a space surrounded by the second inner panel 56, the first inner panel 54, and the rear panel 14 on the outside of the second inner panel 56, which is arranged on the outer periphery of the central rear chamber 4.

The central rear chamber 4 communicates directly with both of the front chamber 5 and the outer peripheral chamber 6 through the Communication holes 54b and 56a. The front chamber 5 and the outer peripheral chamber 6 also communicate with each other through the communication holes 54a. In other words, the central rear chamber 4, the front chamber 5, and the outer peripheral chamber 6 communicate with one another through the communication holes 54a, 54b, and 56a. The outer peripheral chamber 6 communicates with the exterior of the airbag 10B through the vent holes 18.

The embodiment also has four communication holes 54a, 54b, and 56a each, which are spaced evenly along the circumference of the airbag 10Bs. The embodiment has also four through holes 56b spaced evenly along the circumference of the airbag 10B. The through holes 56b and the communication holes 56a are out of circumferential phase with respect to the center of the airbag 10B. The through holes 56b are formed on the extension of the direction of the jet of gas from a first gas generator 60 of an inflator 36A (which will be described later) arranged in the central rear chamber 4 through the inflator opening, or in the position opposed to gas ports 60a of the first gas generator 60.

The inflator 36A of the embodiment is substantially cylindrical and has the first gas generator 60 and a second gas generator 62 at the end thereof in axially different positions. The first gas generator 60 is arranged at the lower stage and the second gas generator 62 is arranged at the upper stage in FIG. 5. The first gas generator 60 and the second gas generator 62 have gas ports 60a and 62a in the peripheral side surfaces, respectively. The gas generators 60 and 62 emit gas radially through the gas ports 60a and 62a, respectively.

The gas ports 60a and 62a are each spaced evenly along the circumference of the inflator 36A. The number of the gas ports 60a of the first gas generator 60 is the same (four) as that of the through holes 56b. The gas ports 60a and 62a are out of phase with respect to the axis of the inflator 36A so that the directions of the jet of gas therefrom are not the same.

The flange 38 for fastening the inflator 36A projects from the peripheral side surface in the axial middle of the inflator 36A (on the rear of the first gas generator 60).

The end of the inflator 36A (the first and second gas generators 60 and 62) is fitted in the inflator-mounting hole 32 of the retainer 30, and the peripheries of the respective inflator openings of the rear panel 14 and the second inner panel 56 of the airbag 10B are pressed to the periphery of the inflator-mounting hole 32 of the retainer 30 with the ferrule 42 for holding. The end of the inflator 36A fitted in the inflator-mounting hole 32 is inserted into the central rear chamber 4 through the inflator openings. The gas ports 60a of the first gas generator 60 of the inflator 36A are opposed to the through holes 65b of the second inner panel 56.

The stud bolts 44 of the ferrule 42 are inserted into the respective bolt insertion holes (not shown) of the rear panel 14, the second inner panel 56, the retainer 30, and the flange 38, on the ends of which the nuts 46 are fastened, thereby fixing the second inner panel 56, the airbag 10B, and the inflator 36A to the retainer 30. The airbag 10B is folded, and the module cover 48 is mounted to the retainer 30 so as to cover the folded airbag 10B; thus, the airbag system is formed. The airbag system is also mounted to the steering wheel 50 of a car (only the rim 52 is shown in FIG. 5).

In the embodiment, the airbag system is equipped with a controller (not shown) having the function of operating the first and second gas generators 60 and 62 of the inflator 36A at different timings and controlling the operating output of the first and second gas generators 60 and 62 of the inflator 36A depending on the weight, the physique, and the seating position (the distance from the steering wheel 50) of the driver's seat occupant. The vehicle equipped with the airbag system has a sensor (not shown) for sensing the weight, the physique, and the seating position of the driver's seat occupant. The controller controls the output from the first and second gas generators 60 and 62 on the basis of the values sensed at the sensing position.

In the airbag system, the first gas generator 60 of the inflator 36A is activated in a car crash. The gas from the first gas generator 60 is supplied to the central rear chamber 4 to inflate it first. The gas then flows into the front chamber 5 and the outer peripheral chamber 6 through the communication holes 54b and 56a to inflate them.

With the embodiment, the second inner panel 56 for partitioning the central rear chamber 4 and the outer peripheral chamber 6 from each other has the through holes 56b on the extension of the direction of the jet of gas from the first gas generator 60, or in the position opposed to the gas ports 60a of the inflator 36A. Therefore, when the inflator 36A is activated, the gas is discharged from the gas ports 60a of the first gas generator 60 toward the through holes 56b and directly supplied also to the outer peripheral chamber 6 through the through holes 56b. Therefore, the outer peripheral chamber 6 is inflated sideward substantially at the same time as the central rear chamber 4. Consequently, the airbag 10B is allowed to receive an occupant early also by the outer periphery.

After the first gas generator 60 has started to operate, the second gas generator 62 is activated after a predetermined time to supply gas into the central rear chamber 4, the front chamber 5, and the outer peripheral chamber 6, thereby sufficiently inflating the airbag 10B also along the thickness.

When an occupant has struck against the inflated airbag 10B, the gas in the airbag 10B flows out through the vent holes 18 to the exterior of the airbag 10B to absorb the impact. At that time, since the front chamber 5 does not directly face the vent holes 18, the gas in the front chamber 5 flows out through the vent holes 18 to the exterior of the airbag 10B via the outer peripheral chamber 6 or the central rear chamber 4 and the outer peripheral chamber 6. Accordingly, the gas is held in the front chamber 5 for a relatively long time as compared with the conventional one.

With the airbag system, after the first gas generator 60 has started to operate, the second gas generator 62 is activated after a predetermined time, thus continuing to supply gas to the airbag 10B for a relatively long time. Consequently, the inner pressure in the airbag 10B is maintained high over a long time.

According to the embodiment, the front chamber 5 of the airbag 10B occupies substantially the whole of the front of the airbag 10B. Thus, the inner pressure of substantially the whole of the front of the airbag 10B is maintained high for a long time.

With the airbag system, the controller is capable of controlling the output of the first and second gas generators 60 and 62 during operation. For example, when the distance between the occupant and the steering wheel is relatively small and when the weight or the physique of the occupant is relatively small, the output of the second gas generator 62 is set lower. This restrains the inflation of the airbag 10B toward the occupant, thus allowing the occupant to be received relatively softly. Even with such an arrangement, the gas can be sufficiently supplied to the outer peripheral chamber 6 from the first gas generator 60; thus, the entire airbag 10B can be inflated sufficiently into a wire area.

When the distance between the occupant and the steering wheel is very large, the output from the second gas generator 62 is set higher and the output from the first gas generator 60 is set lower. With such an arrangement, the sideward inflation of the airbag 10B is restrained, and so the entire airbag 10B is greatly inflated toward the occupant. This allows the occupant to be securely received relatively early.

Although a multistage inflator is used in FIG. 5, a single-stage inflator may be used (for example, denoted by numeral 36).

The above-described embodiments are only examples of the invention and the invention is not limited to those. For example, the above embodiments include four gas ports, communication holes, and through holes each. The number, however, is not limited to four. The shapes of the communication holes and the through holes may be other than those shown in the drawing. The open areas of the communication holes and the through holes are not particularly limited.

The inflator may include more than three gas generators.

An airbag 90 of another embodiment includes a front panel 92, a rear panel 94, and an inner panel 102 formed of a circular web. The front panel 92 and the rear panel 94 are the same in diameter and formed into a bag state by being seamed around the outer peripheries thereof by a seam 95 formed of a string or the like. The seamed portion is a ring shape extending around the outer peripheries of the front panel 92 and the rear panel 94.

The rear panel 94 is formed with an inflator (gas generator) insertion aperture 96 and a vent hole 98. The inflator insertion aperture 96 is disposed at the center of the rear panel 94. Around the inflator insertion aperture 96, a bolt insertion hole 100 is provided.

The inner panel 102 is provided in the airbag 90. The inner panel 102 is disposed substantially concentrically with the front panel 92 and the rear panel 94, and the outer peripheral edge (the periphery on the distal end side of the inner panel 102 in a state in which the airbag 90 is deployed) is seamed to the front panel 92 at the midsection between the center portion and the peripheral portion thereof by a seam 103 formed of string or the like. The seamed portion is a ring shape extending around the outer periphery of the inner panel 102.

The inner panel 102 is formed at the center portion thereof (the portion on the rear end side of the inner panel 102 in a state in which the airbag 90 is deployed) with an inflator insertion aperture 104 to be disposed substantially concentrically with the inflator insertion aperture 96 on the rear panel 94. The openings 96 104 are almost the same in diameter. A bolt insertion hole 106 that aligns the bolt insertion hole 100 on the rear panel 94 is formed around the opening 104 on the inner panel 102.

The inner panel 102 is formed with an inner vent hole 108 at the position relatively close to the outer periphery thereof, and a communication port 107 on the inner side thereof.

The periphery of the inflator insertion aperture 104 of the inner panel 102 is aligned with the periphery of the inflator insertion aperture 96 on the rear panel 94, and is in turn aligned with the periphery of an inflator mounting port 112 of a retainer 110. Then the peripheries of the inflator insertion apertures 104, 96 are fixed to the retainer 110 via the bolt insertion holes 106, 100. Accordingly, the periphery of the inflator insertion aperture 104 on the inner panel 102 is connected to the periphery of the inflator insertion aperture 96 on the rear panel 94 and the outer periphery of the inner panel 102 is connected to the front panel 92 via the seamed portion (seam) 23.

The interior of the airbag 90 is divided by the inner panel 102 into a first chamber 81 located at the center and a second chamber 82 surrounding the first chamber 81. The first chamber 81 corresponds to the inside of the inner panel 102.

The communication port 107 is disposed on the rear end side (on the side of the rear panel 94) of the first chamber 81, and the inner vent hole 108 is disposed on the front end side (on the side of the front panel 92) of the first chamber 81. The communication port 107 is formed at the position opposing a gas injection port 118a of a first gas generating unit 88 of an inflator 86 described later, which is arranged in the first chamber 81, via the inflator insertion apertures 96, 104.

Figure 8:
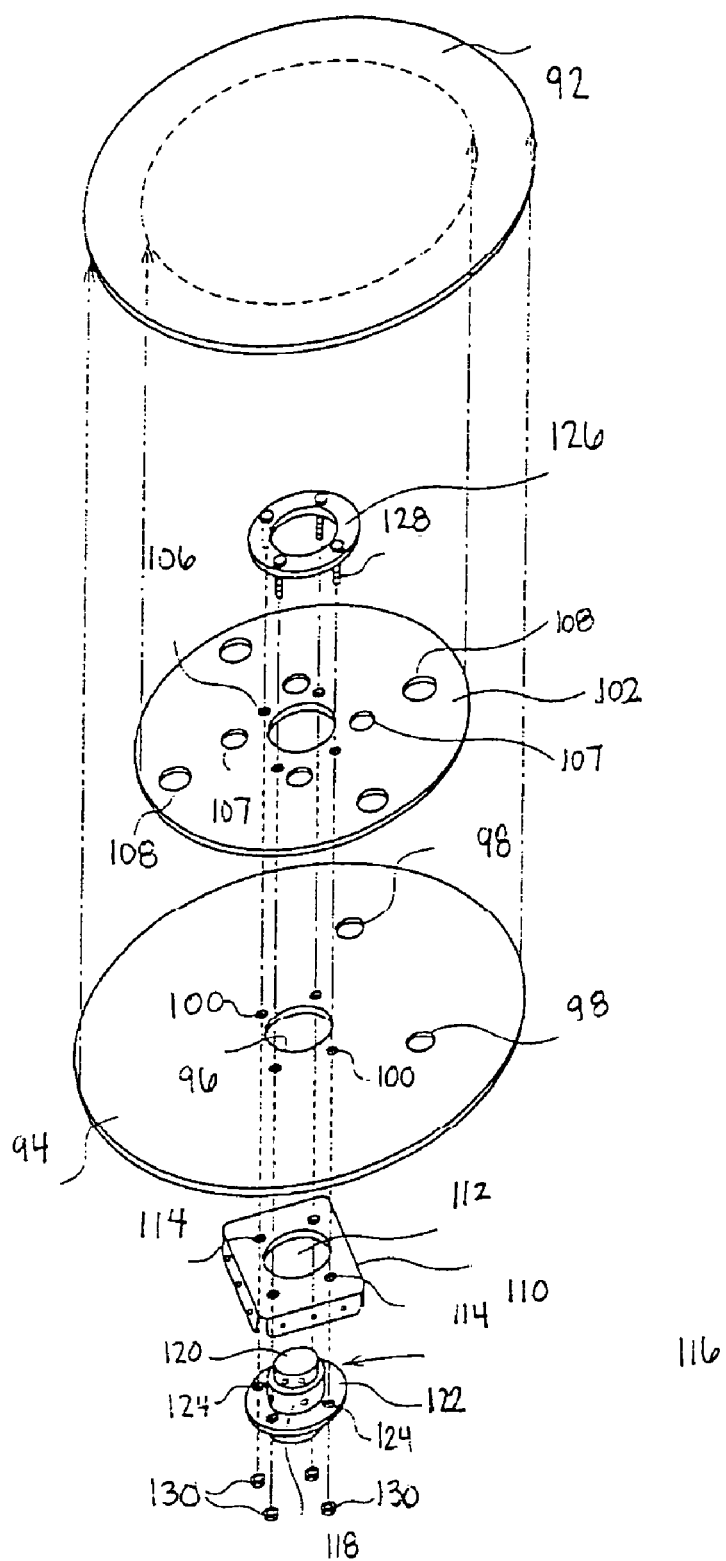
FIG. 8 is an exploded perspective view of the airbag system shown in FIG. 6.

In this embodiment, as shown in FIG. 8, there are four communication ports 107 and four inner vent holes 108 formed at regular intervals in the circumferential direction of the airbag, respectively. The phases of the communication ports 107 and of the inner vent holes 108 are shifted in the circumferential direction with respect to the center of the airbag.

Patches or the like for reinforcement may be attached to the peripheries of the openings 96, 104, the communication ports 107, and the vent holes 98, 108.

The inflator 116 is substantially cylindrical in this embodiment. The inflator 116 is provided at the distal end thereof with the first gas generating unit 118 and a second gas generating unit 120 at axially different positions. The second gas generating unit 120 is disposed on the upper side of the first gas generating unit 118 in FIG. 6 and FIG. 7. The first and the second gas generating units 118, 120 are formed with gas injection ports 118a, 120a respectively on the side peripheral surfaces thereof. In this embodiment, four each of gas injection ports 118a, 120a are formed at regular intervals circumferentially of the inflator 116. The phases of these injection ports 118a, 120a are shifted axially of the inflator 116. The gas generating units 118, 120 inject gas in the radial direction from the gas injection ports 118a, 120a.

A flange 122 for fixing the inflator is projected from the side peripheral surface of the inflator 116 at the axially midsection (on the rear end side with respect to the gas generating units 118, 120). The flange 122 is formed with bolt insertion holes 124.

The inflator 116 is fitted to the inflator mounting port 112 of the retainer 110 at the distal end thereof.

When mounting the airbag 90 to the retainer 110, the peripheries of the inflator insertion apertures 96, 104 of the rear panel 94 and the inner panel 102 are pressed against the periphery of the inflator mounting port 112 of the retainer 110 by a retaining ring 126. The distal end side of the inflator 116, which is fitted into the inflator mounting port 112, is inserted into the first chamber 81 via the inflator insertion apertures 96, 104. The gas injection ports 118a of the first gas generating unit 118 provided at the distal end of the inflator 116 oppose the respective communication ports 107 of the inner panel 102. On the other hand, the gas injection ports 120a of the second gas generating unit 120 do not oppose the communication port 107, respectively.

Figure 6:
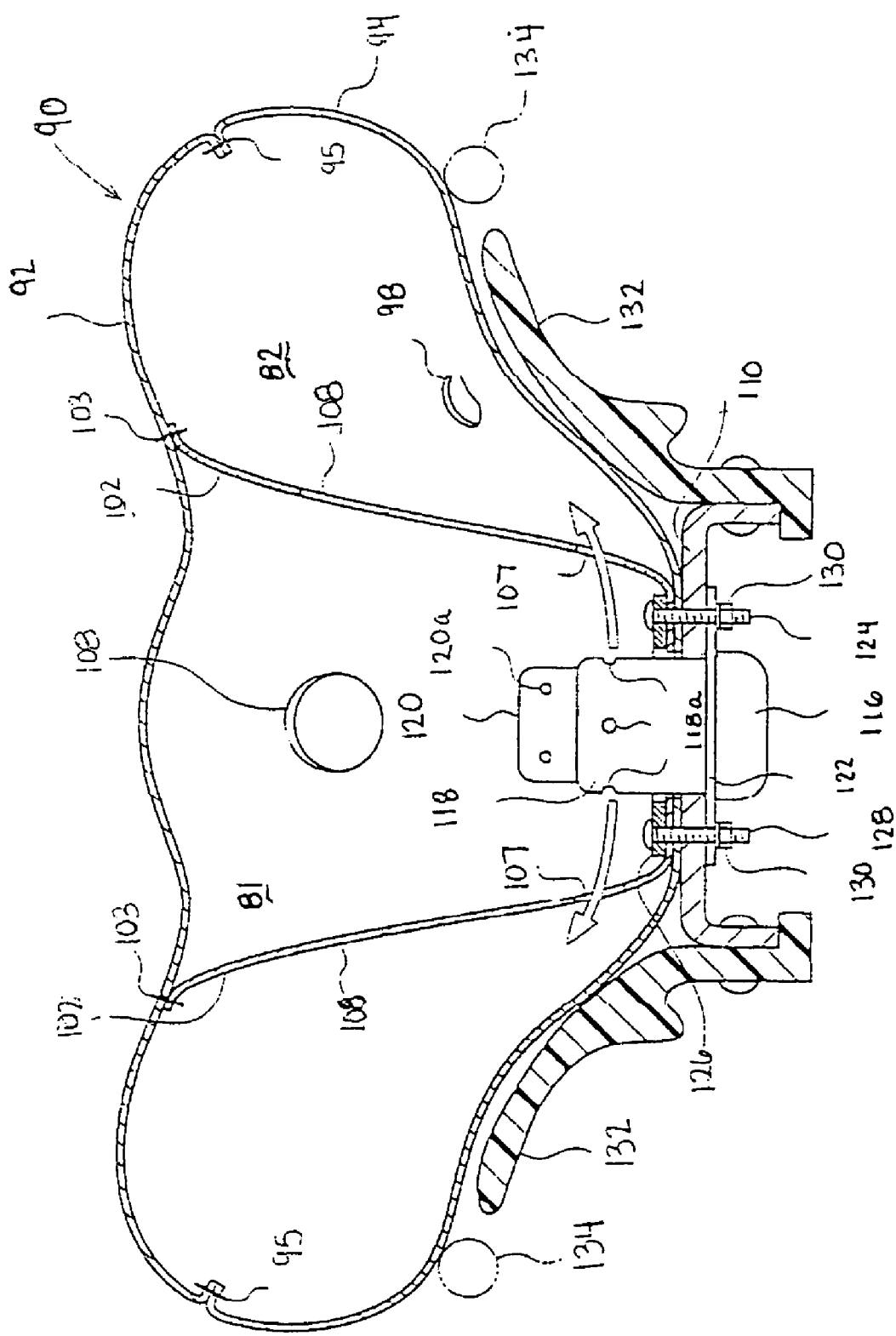
FIG. 6 is a cross-sectional view of an airbag system according to an embodiment of the present invention.
Figure 7:
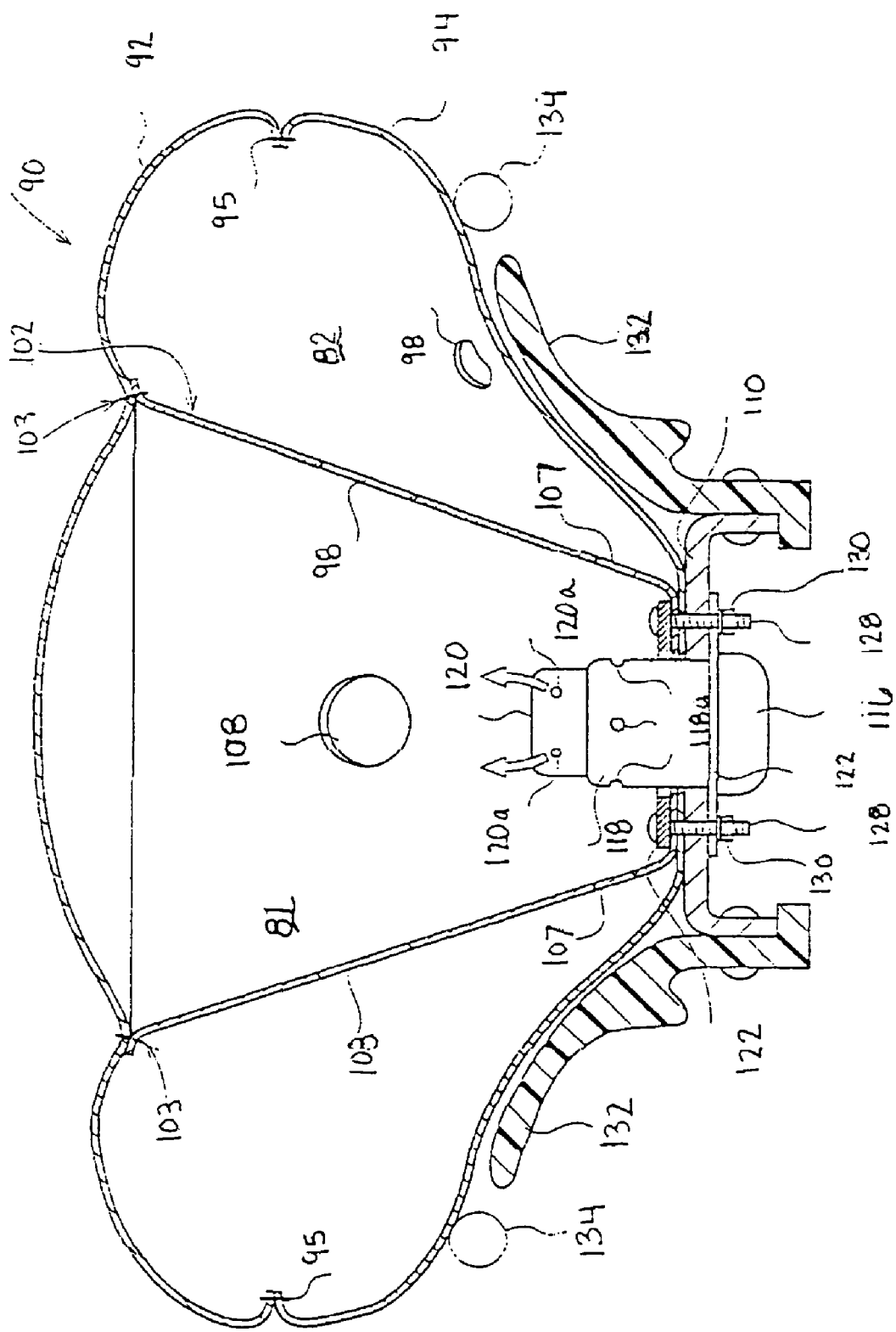
FIG. 7 is a cross-sectional view of the airbag system shown in FIG. 6 when the deployment of an airbag is completed.

In this case, by passing stud bolts 128 of the retaining ring 126 into the bolt insertion holes 106, 100, 114, 124 and tightening nuts 130 on the extremities thereof, the inner panel 102, the airbag 90, and inflator 116 are fixed to the retainer 110. Then, by folding the airbag 90, and mounting a module cover 132 to the retainer 110 so as to cover the folded body of the airbag 90, the airbag system is constructed. The airbag system is installed in a steering wheel of a vehicle (only a rim portion 134 is shown in FIG. 6 and FIG. 7).

The airbag system is provided with a control unit (not shown) for actuating the inflator 116 upon detecting a vehicle collision. The control unit includes an adjusting function for adjusting the outputs or the timings of actuation of the first and the second gas generating units 118, 120 of the inflator 116 individually depending on the weight, the physical constitution, the sitting position (the distance from the steering wheel) and the like of an occupant seated on the driver's seat of the motor vehicle. Though it is not shown, a detecting unit for detecting the weight, the physical constitution, the sitting position (the distance from the steering wheel) and the like of the occupant seated on the driver's seat of the vehicle is mounted to the motor vehicle to which this airbag is installed. The control unit adjusts the outputs or the timings of actuation of the first and the second gas generating units 118, 120 based on the detected output from the detecting unit.

In the airbag system so constructed, in case of a vehicle collision, the inflator 116 is actuated and gas is injected into the airbag 90. The airbag 90 is deployed by the gas, pushes and opens the module cover 132, and is deployed in the cabin to protect the occupant on the driver's seat.

In the airbag 90, since the communication port 107 for communicating the first chamber 81 and the second chamber 82 opposes the gas injection port 118a of the first gas generating unit 118 of the inflator 116, which is disposed in the first chamber 81, gas is injected toward the communication port 107 from the gas injection port 118a when the inflator 116 is actuated. Therefore, gas from the inflator 116 is supplied directly to the second chamber 82 through the communication port 107, as shown in FIG. 6. Accordingly, the second chamber 82 is deployed early.

In this airbag system, the gas injection port 120a of the second gas generating unit 120 does not oppose the communication port 107, gas from the second gas generating unit 120 is substantially supplied only to the first chamber 81. Therefore, by adjusting the outputs of the first gas generating unit 118 and the second gas generating unit 120 respectively, the internal pressure or the speed of deployment can be adjusted individually for the first chamber 81 and the second chamber 82. In addition, by adjusting the timings of actuation of the first gas generating unit 118 and the second gas generating unit 120, the timings of starting deployment and the timings of completion of deployment of the first chamber 81 and the second chamber 82 may be adjusted.

For example, when the distance between the occupant and the steering wheel is relatively short, or when the weight or the physical constitution of the occupant is relatively small, the output of the second gas generating unit 120 is set to a relatively small value. Accordingly, increase in the internal pressure in the first chamber 81 or the extent of deployment toward the occupant is restrained, so that the occupant is received relatively softly. In such a case as well, since the gas is sufficiently supplied from the first gas generating unit 118 to the second chamber 82, the entire airbag 90 can be deployed sufficiently widely.

On the other hand, when the distance between the occupant and the steering wheel is significantly large, the output of the second gas generating unit 120 is set to a relatively large value, and the output of the first gas generating unit 88 is set to a relatively small value. In such a case, deployment of the airbag 90 toward the sides is restrained and the entire airbag 90 is deployed to a large extent toward the occupant. Accordingly, the occupant can securely be received in a relatively early stage.

In this embodiment, when the occupant crashes the deployed airbag 90, gas in the first chamber 81 and the second chamber 82 flows out through the inner vent hole 108 or the vent hole 98 for absorbing the impact.

The embodiment described above is an example of the present invention, and the present invention is not limited to the above-described embodiment. For example, though four each of gas injection ports 118a, 120a of the respective gas generating units 118, 120 and the communication ports 107 are provided in the above-described embodiment, they are not limited to four. Though all the gas injection ports 118a of the first gas generating unit 118 oppose the communication port 107 respectively in the embodiment described above, it is also possible that only some of the gas injection ports 118a oppose the communication port 107. It is also possible to provide three or more of gas generating units.

The configuration of the communication port 107 may be a shape other than the shape shown in the drawing. The opening area of the communication port 107 may be selected depending on the internal volume and the like of the second chamber 82, and is not specifically limited.

Although the embodiment described above is an example of application of the present invention to the airbag for the driver's seat and the airbag system for the driver's seat, the present invention may be applied to other airbag systems for various applications.

As described above, according to the present embodiment, in an airbag divided into a first chamber in which an inflator is disposed and a second chamber surrounding it, early deployment of the second chamber is enabled, and individual adjustment of the internal pressure or the speed of deployment for the first chamber and the second chamber is enabled.

An airbag 160 includes a front panel 162, a rear panel 164, and an inner panel 172, each made from a round-shaped piece of cloth. The front panel 162 and the rear panel 164 have the same diameter and the outer circumferential portions thereof are stitched together with a seam 165 composed of thread or the like so as to shape a bag. This stitched portion has a circular ring shape extending around the outer peripheries of the front panel 162 and the rear panel 164.

The rear panel 164 has an inflator-engaging (a gas-generator-engaging) opening 166 and vent holes 168 formed therein. The inflator-engaging opening 166 is disposed at the central portion of the rear panel 164. The rear panel 164 has bolt through-holes 170 formed around the inflator-engaging opening 166.

The airbag 160 has the inner panel 172 disposed therein. The inner panel 172 is almost concentrically disposed with the front panel 162 and the rear panel 164, and its outer of the front of the inner panel 172 with the airbag 160 being inflated) is stitched together with an intermediate portion lying between the central portion and the circumferential portion of the front panel 162 with a seam 173 composed of thread or the like. This stitched portion has a circular ring shape extending around the outer periphery of the inner panel 172.

The inner panel 172 has an inflator-engaging opening 174 formed at the central portion thereof (i.e., the rear portion of the inner panel 172 with the airbag 160 being inflated) so as to be substantially concentric with the inflator-engaging opening 166 of the rear panel 164. The openings 166 and 174 have substantially the same diameter. Also, the inner panel 172 has bolt through-holes 176 overlying on the bolt through-holes 170 of the rear panel 164, formed around the opening 174.

The inner panel 172 has inner vent holes 178 formed relatively close to the outer circumference thereof and communication ports 177 formed closer to the inner periphery thereof relative to the inner vent holes 178.

The circumferential portion of the inflator-engaging opening 174 of the inner panel 172 is over laid on the circumferential portion of the inflator-engaging opening 166 of the rear panel 164 and is then overlaid on the circumferential portion of an inflator-fixing opening 182 of a retainer 180. Then, the circumferential portions of the inflator-engaging openings 174 and 166 are fixed to the retainer 180 by inserting blots into the bolt through-holes 176 and 170. With this arrangement, the circumferential portion of the inflator-engaging opening 174 of the inner panel 172 is connected to the circumferential portion of the inflator-engaging opening 166 of the rear panel 164, and the outer circumferential portion of the inner panel 172 is connected to the front panel 162 with the stitched portion (seam) 123.

With this inner panel 172, the inner space of the airbag 160 is partitioned into a central first compartment 151 and a second compartment 152 encircling the first compartment 151. The first compartment 151 lies inside the inner panel 172.

The communication ports 177 are disposed close to the rear of the first compartment 151 (i.e., close to the rear panel 164), and the inner vent holes 178 are disposed close to the front of the first compartment 151 (i.e., close to the front panel 162). The communication ports 177 are formed on the lines extending along the gas-discharge directions of an inflator 186, which will be described later, disposed in the first compartment 151 so as to extend through the inflator-engaging openings 166 and 174, that is, the communication ports 177 are formed so as to face gas-discharge openings 186a of the inflator 186.

Figure 11:
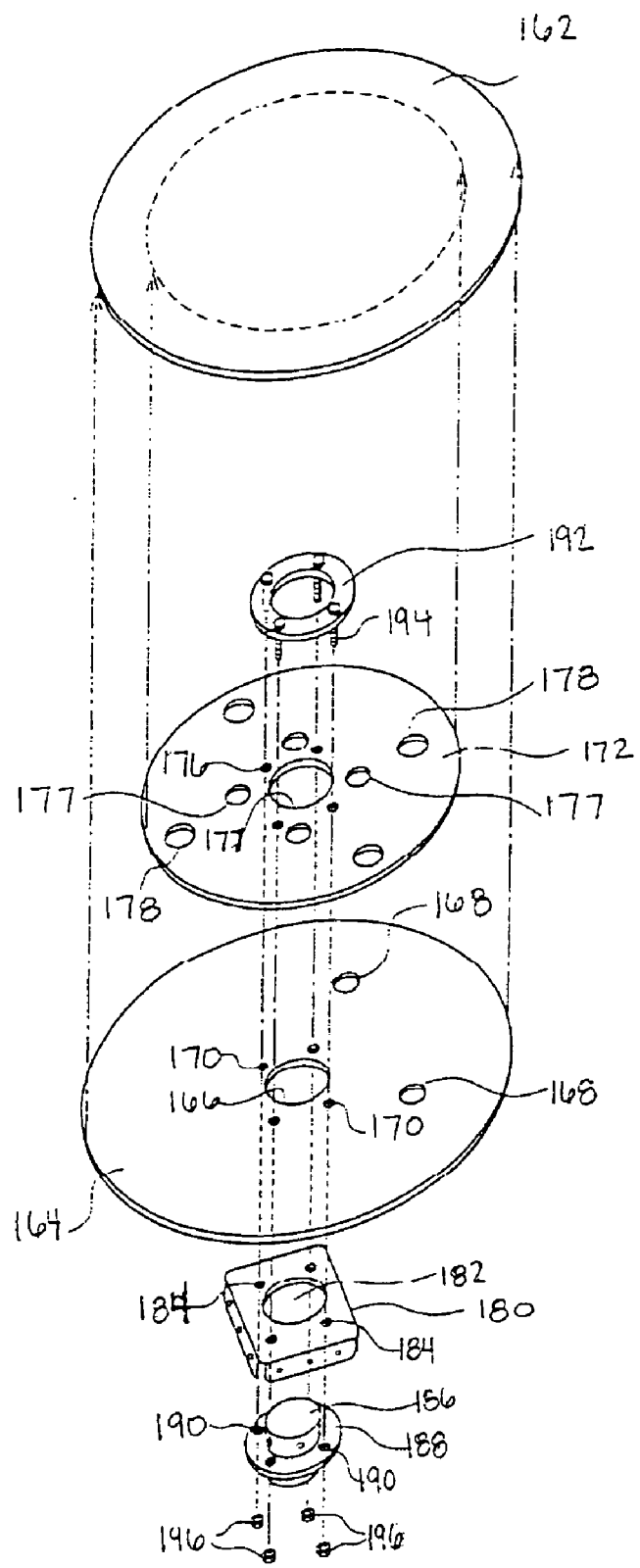
FIG. 11 is an exploded perspective view of the airbag and the airbag apparatus shown in FIG. 9.

In this embodiment, as shown in FIG. 11, the four communication ports 177 and the four inner vent holes 178 are both evenly spaced in the circumferential direction of the airbag. Also, the four communication ports 177 and the four inner vent holes 178 are out of phase from each other in the circumferential direction with respect to the center of the airbag.

Meanwhile, the openings 166 and 174, the communication ports 177 and the vent holes 168 and 178 may have reinforcement patches or the like fixed to the respective circumferential portions thereof.

The retainer 180 for having the airbag 160 fixed thereto has the inflator-fixing opening 182 formed at the central portion thereof and also has bolt through-holes 184 formed around the inflator-fixing opening 182.

The inflator 186 is approximately cylindrical and has the gas-discharge openings 186a formed in the peripheral side surface of the front thereof lying in the axial direction of the cylinder. In this embodiment, the four gas-discharge openings 186a are evenly spaced in the circumferential direction of the inflator 186. The inflator 186 is constructed so as to discharge gas in radial directions from the gas discharge openings 186a. The inflator 186 has an inflator-fixing flange 188 formed in a protruding manner on the peripheral side surface of a middle portion thereof lying (closer to the rear thereof relative to the gas-discharge openings 186a) in the axial direction of the cylinder. The flange 188 has bolt through-holes 190 formed therein. The front of the inflator 186 is fitted into the inflator-fixing opening 182 of the retainer 180.

In order to fix the airbag 160 to the retainer 180, the circumferential portions of the inflator-engaging openings 166 and 174 of the rear panel 164 and the inner panel 172, respectively, are pressed on the circumferential portion of the inflator-fixing opening 182 of the retainer 180 with a pressure ring 192. The front of the inflator 186 fitted into the inflator-fixing opening 182 is inserted into the first compartment 151 through the inflator-engaging openings 166 and 174. The gas-discharge openings 186a formed in the front of the inflator 186 face the corresponding communication ports 177 of the inner panel 172.

Figure 9:
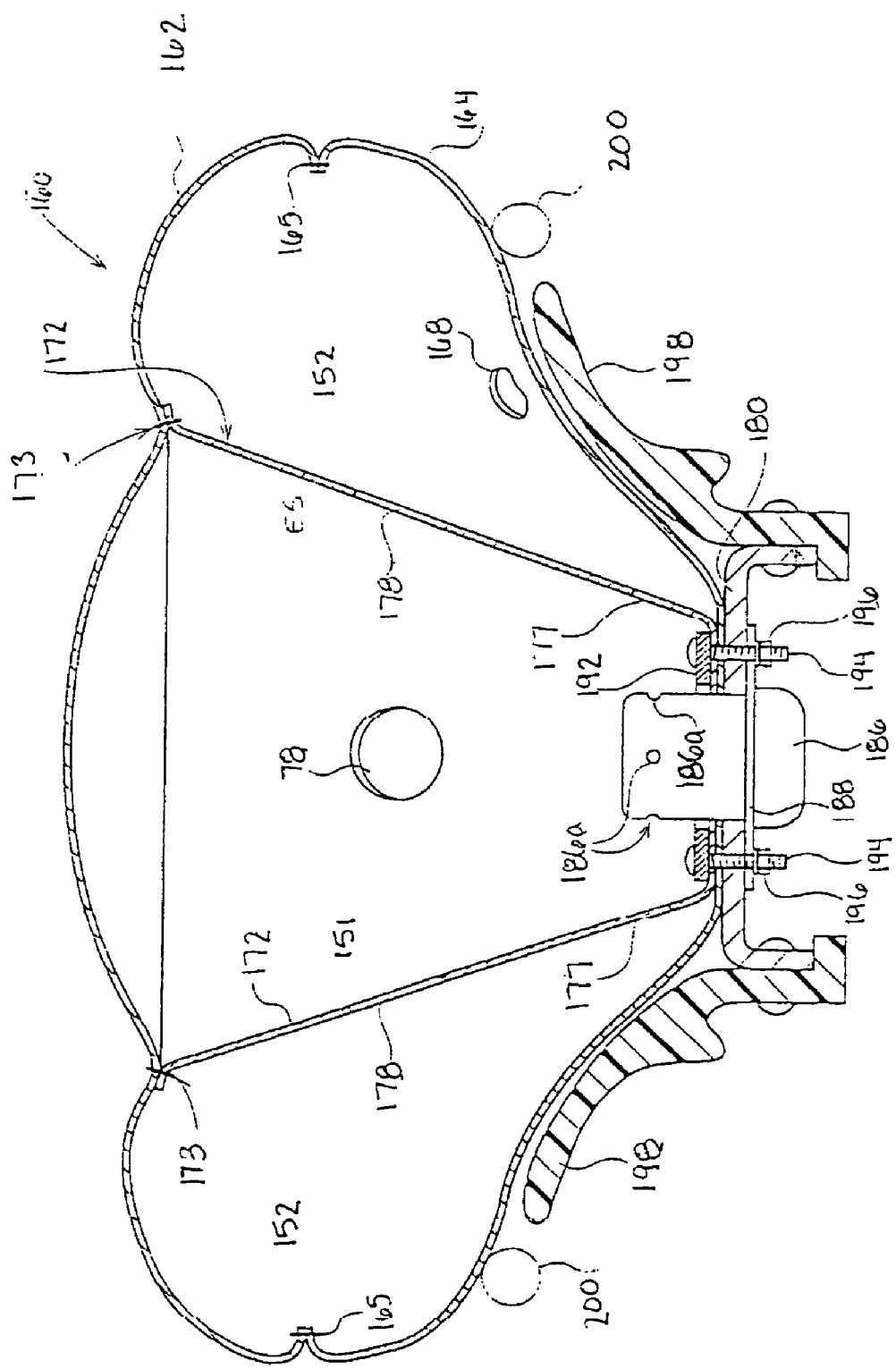
FIG. 9 is a sectional view of an airbag and an airbag apparatus according to an embodiment of the present invention.
Figure 10:
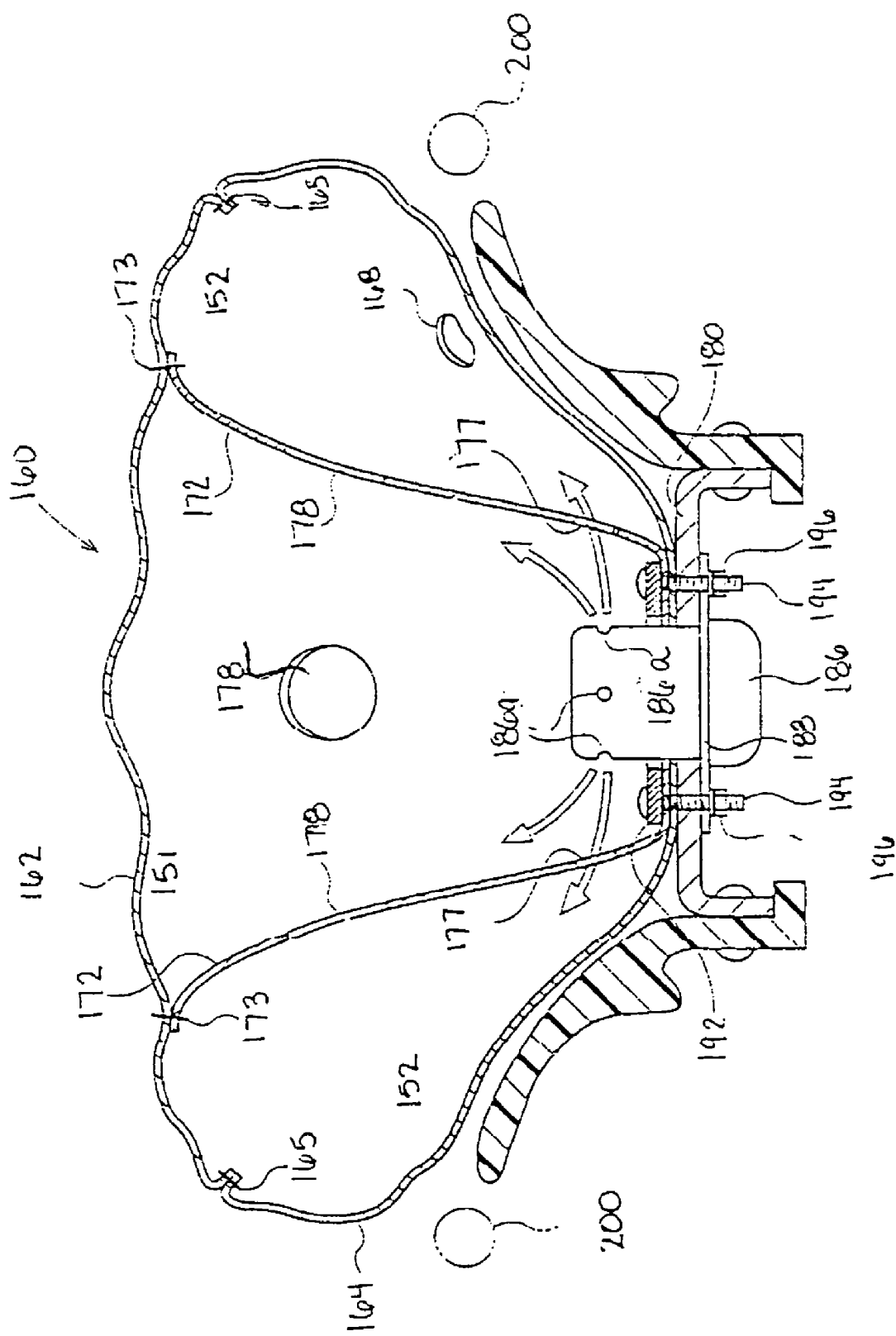
FIG. 10 is a sectional view of the inflating airbag shown in FIG. 9.

In this state, by inserting stud bolts 194 of the pressure ring 192 through the bolt through-holes 176, 170, 184, and 190 and then by screwing nuts 196 onto the tops of the stud bolts 194, the inner panel 172, the airbag 160, and the inflator 186 are fixed to the retainer 180. Subsequently, by folding the airbag 160 and then fixing a module cover 198 to the retainer 180 so as to cover the folded airbag 160, the airbag apparatus is formed. This airbag apparatus is mounted on a steering wheel of a car (although only a rim 200 of the steering wheel is shown in FIGS. 9 and 10).

In a car collision or the like, the inflator 186 is activated so as to discharge gas into the airbag 160. When inflated with the gas, the airbag 160 pushes out the module cover 198 and then expands in the passenger compartment so as to protect a driver-side passenger.

In the airbag 160, since the communication ports 177 for mutual communication of the first compartment 151 and the second compartment 152 are disposed on the lines extending along the gas-discharge directions of the inflator 186 disposed in the first compartment 151, that is, the communication ports 177 are disposed so as to face the gas-discharge openings 186a of the inflator 186, when the inflator 186 is activated, gas flows from the gas-discharge openings 186a toward the communication ports 177. Thus, as shown in FIG. 10, part of the gas discharged from the inflator 186 flows through the communication ports 177 and is directly fed to the second compartment 152. With this arrangement, the second compartment 152 inflates at an early stage.

When the passenger runs into the inflated airbag 160, the gas in the first compartment 151 and the second compartment 152 flows out through the inner vent holes 178 and the vent holes 168, respectively; thus a shock is absorbed.

In this embodiment, for example, by making the communication ports 177 slightly smaller so that part of the gas flowing from the gas-discharge openings 186a toward the communication ports 177 strikes the edges of the communication ports 177 and flows into the first compartment 151, the first compartment 151 and the second compartment 152 can be arranged so as to inflate almost simultaneously. In this case, when each of the communication ports 177 has a round shape, the diameter of the communication port 177 may be made smaller. Also, the communication port 177 may have an elliptical shape, a rectangular shape, or the like. In addition, the communication port 177 may have any one of a variety of shapes other than the above-mentioned ones.

The foregoing embodiment is an example of the present invention, and the present invention is not limited to the foregoing embodiment. Although the numbers of the gas discharge openings 186a and the communication ports 177 are respectively set at four in foregoing embodiment by way of example, the numbers are not limited to four. Also, although the communication ports 177 are disposed on the lines extending along the gas-discharge directions of all the gas-discharge openings 186a of the inflator 186 in the foregoing embodiment, the communication ports 177 may be disposed on the lines extending along the gas-discharge directions of a part of the gas-discharge openings 186a, and the panel portion of the inner panel 172 may lie on the lines extending along the gas-discharge directions of the remaining of the gas-discharge openings 186a.

In the present invention, one or some of the communication ports may be disposed out of the lines extending along the gas-discharge directions of the gas-discharge openings 186a so as not to face any of the gas-discharge openings 186a.

In the present invention, a part of the gas-discharge openings 186a facing the communication ports 177 may be arranged so as to serve as second-compartment gas-discharge openings, and the panel portion of the inner panel 172 may be arranged so as to lie on the lines extending along the remaining of the gas-discharge openings 186a so that the remaining of the gas-discharge openings 186a serve as first-compartment gas-discharge openings. In this case, since the first compartment 151 is mainly inflated with gas flowing from the first-compartment gas-discharge openings and the second compartment 152 is mainly inflated with gas flowing from the second-compartment gas-discharge openings, by adjusting the numbers and the diameters of the first-compartment gas-discharge openings and the second-compartment gas-discharge openings, the first compartment 151 and the second compartment 152 can be inflated almost simultaneously.

Although the forgoing embodiment has been illustrated as an application of the present invention to a driver-side airbag and a driver-side airbag apparatus, the present invention can be applicable to a variety of airbags and airbag apparatuses other than the above-described ones.

As described above, according to the present invention, in an airbag which is partitioned into a first compartment having an inflator disposed therein and a second compartment encircling the first compartment, early inflation of the second compartment can be achieved.

As described above, an object of the invention is to provide an airbag and an airbag system capable of maintaining high inner pressure for a relatively long time even with a low-capacity inflator.

While the above embodiments are examples of application of the invention to a driver's seat airbag and a driver's seat airbag system, the invention can also be applied to other airbags and airbag systems of various uses.

The priority applications, Japan Patent Application 2003-015110, filed Jan. 23, 2003, Japan Patent Application 2003-015111, filed Jan. 23, 2003, Japan Patent Application 2003-15109, filed Jan. 23, 2003, and Japan Patent Application 2003-031139, filed Feb. 7, 2003, including the specification, drawings, claims and abstract, are incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag comprising openings in a rear panel for receiving inflation gas and a front panel configured to face an occupant of a vehicle wherein:
   the interior of the airbag is partitioned into a central chamber facing the openings, an outer-peripheral front chamber arranged on the outer periphery of the central chamber adjacent to the front panel, and an outer-peripheral rear chamber arranged on the outer periphery of the central chamber adjacent to the rear panel;
   the outer-peripheral rear chamber communicates with the exterior of the airbag through vent holes;
   the central chamber communicates directly with the outer-peripheral front chamber and the outer-peripheral rear chamber;
   the outer-peripheral front chamber and the outer-peripheral rear chamber communicate with each other only via the central chamber; and
   wherein the airbag is configured so that the gas for inflating the airbag flows from the central chamber into the outer-peripheral front chamber and the outer-peripheral rear chamber.

2. An airbag comprising openings for supplying gas on the rear and facing an occupant in inflation on the front, wherein:
   the interior of the airbag is partitioned into a central chamber facing the openings, an outer-peripheral front chamber arranged on the outer periphery of the central chamber adjacent to the front, and an outer-peripheral rear chamber arranged on the outer periphery of the central chamber adjacent to the rear;
   the outer-peripheral rear chamber communicates with the exterior of the airbag through vent holes;
   the central chamber communicates directly with the outer-peripheral front chamber and the outer-peripheral rear chamber;
   the outer-peripheral front chamber and the outer-peripheral rear chamber communicate directly with each other; and
   wherein the airbag is configured so that the gas for inflating the airbag flows from the central chamber into the outer-peripheral front chamber and the outer-peripheral rear chamber.

3. An airbag according to claim 1, wherein the central chamber is arranged to reach from the rear to the front of the airbag during inflation.

4. An airbag according to claim 2, wherein the central chamber is arranged to reach from the rear to the front of the airbag during inflation.

5. An airbag system comprising an airbag and an inflator for inflating the airbag, wherein:
   the interior of the airbag is partitioned into a central chamber facing the openings, an outer-peripheral front chamber arranged on the outer periphery of the central chamber adjacent to the front, and an outer-peripheral rear chamber arranged on the outer periphery of the central chamber adjacent to the rear;
   the outer-peripheral rear chamber communicates with the exterior of the airbag through vent holes;
   the central chamber communicates directly with the outer-peripheral front chamber and the outer-peripheral rear chamber;
   the outer-peripheral front chamber and the outer-peripheral rear chamber communicate with each other only via the central chamber; and
   wherein the airbag is configured so that the gas for inflating the airbag flows from the central chamber into the outer-peripheral front chamber and the outer-peripheral rear chamber; and
   gas from the inflator is supplied to the central chamber.

6. An airbag system according to claim 5, wherein the central chamber is arranged to reach from the rear to the front of the airbag during inflation.

7. An airbag system comprising an airbag and an inflator for inflating the airbag, wherein:
   the interior of the airbag is partitioned into a central chamber facing the openings, an outer-peripheral front chamber arranged on the outer periphery of the central chamber adjacent to the front, and an outer-peripheral rear chamber arranged on the outer periphery of the central chamber adjacent to the rear;
   wherein the outer-peripheral rear and front chambers communicate directly with the exterior of the airbag through vent holes; and
   wherein the central chamber communicates directly with the outer-peripheral front chamber and the outer-peripheral rear chamber; and
   wherein the airbag is configured so that the gas for inflating the airbag flows from the central chamber into the outer-peripheral front chamber and the outer-peripheral rear chamber; and
   gas from the inflator is supplied to the central chamber.

8. An airbag system according to claim 7, wherein the central chamber is arranged to reach from the rear to the front of the airbag during inflation.

9. An airbag system comprising:
   an airbag having openings for receiving an inflation gas in a rear panel and having front panel configured to face an occupant; and
   an inflator for inflating the airbag, wherein:
   the interior of the airbag includes:
   a central rear chamber arranged adjacent the rear panel and facing the openings;
   a front chamber arranged adjacent the front panel; and
   an outer-peripheral chamber arranged on the outer periphery of the central rear chamber;
   wherein the central rear chamber, the front chamber, and the outer-peripheral chamber communicate with one another; and
   wherein the inflator includes a plurality of gas generators configured to generate gas with different timings.

10. An airbag system according to claim 9, wherein the front chamber of the airbag occupies substantially the entire area adjacent the front panel of the airbag.

11. An airbag system comprising:
    an airbag having a front panel and a rear panel;
    the front panel and the rear panel being joined at the peripheral edges thereof;
    the rear panel comprising a central opening for receiving a gas generator;
    an inner panel for dividing the interior of the airbag into a centrally located first chamber and a second chamber surrounding the first chamber;
    the inner panel including a central opening substantially concentric with the opening of the rear panel; and
    the inner panel being joined along the peripheral edge thereof on the distal end side to the front panel at the midsection between the central portion and the peripheral edge thereof;

wherein the gas generator includes first and second gas generating units, wherein the gas generating units each include a gas injection port; and wherein the inner panel includes a port that permits fluid communication between the first chamber and the second chamber, the port being positioned to oppose the gas injection port of the first gas generating unit and wherein the gas injection port of the second gas generating unit does not oppose the port of the inner panel when the airbag is deployed.

12. An airbag system according to claim 11, wherein the rear panel is formed with a vent hole, and the inner panel is formed with an inner vent hole that permits fluid communication between the first chamber and the second chamber.

13. An airbag system comprising:
an airbag having first and second chambers and a plurality of ports that are configured to permit fluid communication between the first and second chambers; wherein each port is positioned directly opposite a gas injection port of a gas generating unit.

14. An airbag system comprising:
a gas generator; and an airbag, the airbag includes:
a front panel and a rear panel, the circumferential portions of the front panel and the rear panel being bonded to each other, wherein the rear panel has a gas-generator-engaging opening formed at the central part thereof,
an inner panel for partitioning the inner space of the airbag into a central first compartment and a second compartment encircling the first compartment,
wherein the inner panel has a central opening almost concentric with the opening of the rear panel,
wherein the front circumferential portion of the inner panel is bonded to an intermediate portion lying between a central portion and the circumferential portion of the front panel,
wherein the inner panel has at least one communication port formed close to the rear thereof, for mutual communication of the first compartment and the second compartment, and
wherein the communication port lies on the line extending along a gas-discharge direction of the gas generator when the airbag is inflated.

15. The airbag according to claim 14, wherein the rear panel has at least one vent hole formed therein, and the inner panel has at least one inner vent hole formed therein for mutual communication of the first compartment and the second compartment.

16. An airbag apparatus comprising:
an airbag and a gas generator having at least one gas-discharge opening,
wherein at least the front of the gas generator is disposed in the airbag and the gas-discharge opening is disposed in the airbag,
wherein the airbag includes a front panel and a rear panel disposed remote from the passenger, the circumferential portions of the front panel and the rear panel being bonded to each other,
wherein the rear panel has a gas-generator-engaging opening formed at the central part thereof,
wherein the airbag further includes an inner panel for partitioning the inner space of the airbag into a central first compartment and a second compartment encircling the first compartment,
wherein the inner panel has an opening formed at the central part thereof so as to be almost concentric with the opening of the rear panel, wherein the front circumferential portion of the inner panel is bonded to an intermediate portion lying between the central portion and the circumferential portion of the front panel,
wherein the inner panel includes a port that permits fluid communication between the first compartment and the second compartment, wherein the port is located on a line extending in a direction that gas is discharged from the gas-discharge opening of the gas generator.

17. The airbag apparatus according to claim 16,
wherein the gas generator includes a plurality of gas-discharge openings,
wherein the inner panel includes a plurality of communication ports, wherein more than one of the plurality of communication ports is located along a line extending in a direction that gas is discharged from one of the gas-discharge openings; wherein the panel portion of the inner panel lies on the lines extending along gas-discharge directions of the remaining of the gas-discharge openings.

18. The airbag apparatus according to claim 16, wherein the first compartment and the second compartment inflate almost simultaneously when the gas generator is activated.

19. An airbag apparatus comprising:
an airbag and a gas generator having at least one gas-discharge opening,
wherein at least the front of the gas generator is disposed in the airbag and the gas-discharge opening is disposed in the airbag,
wherein the inner space of the airbag is partitioned into a central first compartment and a second compartment encircling the first compartment, and
wherein the first compartment and the second compartment inflate almost simultaneously when the gas generator is activated.

20. An airbag system according to claim 5, further comprising a plurality of communication ports that are configured to permit fluid communication between the central chamber and the outer-peripheral rear chamber and outer-peripheral front chamber; wherein each communication port is positioned directly opposite a gas injection port of the inflator.

21. An airbag system according to claim 5, further comprising a plurality of communication ports that are configured to permit fluid communication between the central chamber and the outer-peripheral rear chamber and outer-peripheral front chamber, wherein the communication ports are positioned on a line extending along a gas-discharge direction of the inflator when the airbag is inflated.

22. An airbag system according to claim 7, further comprising a plurality of communication ports that are configured to permit fluid communication between the central chamber and the outer-peripheral rear chamber and outer-peripheral front chamber; wherein each communication port is positioned directly opposite a gas injection port of the inflator.

23. An airbag system according to claim 7, further comprising a plurality of communication ports that are configured to permit fluid communication between the central chamber and the outer-peripheral rear chamber and outer-peripheral front chamber, wherein the communication ports are positioned on a line extending along a gas-discharge direction of the inflator when the airbag is inflated.

24. An airbag system according to claim 9, further comprising a plurality of communication ports that are configured to permit fluid communication between the central rear chamber, the front chamber and outer-peripheral chamber;

wherein each communication port is positioned directly opposite a gas injection port of the inflator.

25. An airbag system according to claim 9, further comprising a plurality of communication ports that are configured to permit fluid communication between the central rear chamber, the front chamber and the outer-peripheral chamber, wherein the communication ports are positioned on a line extending along a gas-discharge direction of the inflator when the airbag is inflated.

26. An airbag apparatus according to claim 19, further comprising a plurality of communication ports that are configured to permit fluid communication between the central first compartment and the second compartment; wherein each communication port is positioned directly opposite a gas injection port of the inflator.

27. An airbag apparatus according to claim 19, further comprising a plurality of communication ports that are configured to permit fluid communication between the central first compartment and the second compartment; wherein the communication ports are positioned on a line extending along a gas-discharge direction of the inflator when the airbag is inflated.

* * * * *